(12) United States Patent
Debicka et al.

(10) Patent No.: US 12,705,277 B2
(45) Date of Patent: Aug. 11, 2026

(54) METHODS AND SYSTEMS FOR PROVIDING STREAMS OF MODIFIED MAP OBJECT DEFINITIONS

(71) Applicant: TomTom Global Content B.V., Amsterdam (NL)

(72) Inventors: Aleksandra Anna Debicka, Bukowiec (PL); Jaroslaw Marek Jarmolowicz, Łódź (PL); Marcin Michal Kmiecik, Grantham, NH (US); Dominik Michal Plichta, Bronisin Dworski (PL)

(73) Assignee: TomTom Global Content B.V., Amsterdam (NL)

( * ) Notice: Subject to any disclaimer, the term of this patent is extended or adjusted under 35 U.S.C. 154(b) by 0 days.

(21) Appl. No.: 18/981,585

(22) Filed: Dec. 15, 2024

(65) Prior Publication Data

US 2025/0209112 A1 Jun. 26, 2025

(30) Foreign Application Priority Data

Dec. 20, 2023 (EP) .................................... 23218720
Dec. 20, 2023 (EP) .................................... 23218721

(51) Int. Cl.
*G06F 16/00* (2019.01)
*G06F 16/51* (2019.01)
*G06F 21/64* (2013.01)

(52) U.S. Cl.
CPC .............. *G06F 16/51* (2019.01); *G06F 21/64* (2013.01)

(58) Field of Classification Search
None
See application file for complete search history.

(56) References Cited

U.S. PATENT DOCUMENTS 9,798,740 B2 * 10/2017 Pfeifle ................. G06F 16/2372
11,879,749 B2 * 1/2024 Moustafa ................ G06F 16/29
12,553,742 B2 * 2/2026 Potnis ................ G01C 21/3815
2005/0114016 A1 * 5/2005 Kim ..................... G01C 21/203
340/995.12
2010/0042315 A1 * 2/2010 Ikeuchi ............. G01C 21/3878
701/532
2014/0058661 A1 * 2/2014 Choi .................... G09B 29/106
701/428
2015/0170386 A1 * 6/2015 Chawathe ................. G06T 1/20
345/619
2015/0170387 A1 * 6/2015 Chawathe .............. G06T 17/05
345/635
2017/0006135 A1 * 1/2017 Siebel ....................... G06F 8/24
(Continued)

FOREIGN PATENT DOCUMENTS

EP 3832422 A1 6/2021
WO 2023154199 A1 8/2023

OTHER PUBLICATIONS

Vincenzo Del Fatto et al. “Map Integrity Constraint Verification by using Visual Language Parsing,” Aug. 2008, Journal of Digital Information Management vol. 6 No. 4 (Year: 2008).*

(Continued)

*Primary Examiner* — Polina G Peach
(74) *Attorney, Agent, or Firm* — Buckley, Maschoff & Talwalkar LLC

(57) ABSTRACT

To modify map data, a map layer provision system effects modifications of map layer data and generates and outputs data indicative of the modifications in a stream.

19 Claims, 22 Drawing Sheets

(56) References Cited

U.S. PATENT DOCUMENTS

| | | | | |
|---|---|---|---|---|
| 2018/0097721 | A1* | 4/2018 | Matsui | H04L 45/28 |
| 2018/0136651 | A1* | 5/2018 | Levinson | G05D 1/0027 |
| 2021/0035266 | A1* | 2/2021 | Toroman | G06F 3/04847 |
| 2021/0063199 | A1* | 3/2021 | Akbarzadeh | G01C 21/3841 |
| 2021/0063200 | A1* | 3/2021 | Kroepfl | G01C 21/3841 |
| 2021/0097057 | A1* | 4/2021 | Cajias | G06F 16/29 |
| 2021/0318133 | A1* | 10/2021 | Sharma | G01C 21/3885 |
| 2021/0347382 | A1* | 11/2021 | Huang | G05D 1/0212 |
| 2022/0084398 | A1* | 3/2022 | Zhang | G08G 1/096791 |
| 2022/0319312 | A1* | 10/2022 | Mintz | G07B 15/063 |
| 2023/0127185 | A1* | 4/2023 | Jeong | G01C 21/3819 701/25 |
| 2023/0258472 | A1* | 8/2023 | Ashman | G01C 21/3804 701/24 |
| 2023/0332923 | A1* | 10/2023 | Collins | G06F 16/2219 |
| 2023/0384122 | A1* | 11/2023 | Kim | B60W 60/001 |
| 2024/0096104 | A1* | 3/2024 | Mesde | G06F 16/24568 |
| 2024/0219199 | A1* | 7/2024 | Kulkarni | G01C 21/3841 |
| 2024/0272943 | A1* | 8/2024 | Tadkase | G06F 9/485 |
| 2024/0328822 | A1* | 10/2024 | Fu | G01C 21/3889 |
| 2024/0344845 | A1* | 10/2024 | Hung | G01C 21/387 |
| 2024/0400085 | A1* | 12/2024 | Chamaa | G01C 21/3867 |

OTHER PUBLICATIONS

Extended EP Search Report for EP App. No. 23218720.3 dated May 29, 2024.

Extended EP Search Report for EP App. No. 23218721.1 dated May 6, 2024.

Meta, MaRS—How we keep maps current and accurate, Sep. 2019, accessed on the Internet at https://engineering.fb.com/2019/09/30/ml-applications/mars/, last accessed Dec. 11, 2024.

* cited by examiner

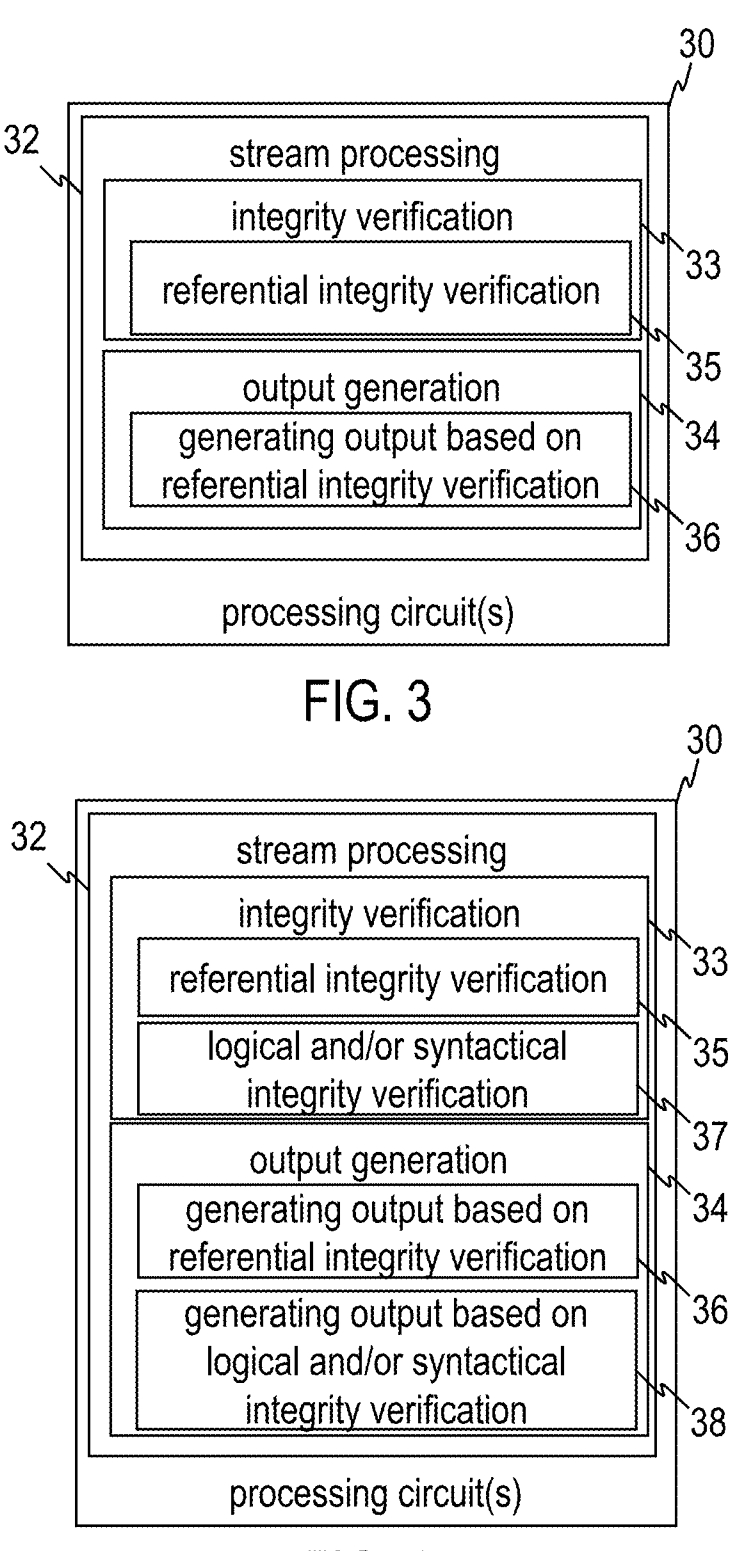
30
32
stream processing
integrity verification
33
referential integrity verification
35
output generation
34
generating output based on referential integrity verification
36
processing circuit(s)
FIG. 3
30
32
stream processing
integrity verification
33
referential integrity verification
35
logical and/or syntactical integrity verification
37
output generation
34
generating output based on referential integrity verification
36
generating output based on logical and/or syntactical integrity verification
38
processing circuit(s)
FIG. 4

250
251
259
20
262
269
map layer provision system(s)
processing system(s)
map data provision
stream processing
quality check(s)
252
32
261
263

METHODS AND SYSTEMS FOR PROVIDING STREAMS OF MODIFIED MAP OBJECT DEFINITIONS

TECHNICAL FIELD

Embodiments of the invention relate to techniques associated with electronic map data, such as map data for use in navigation, driver assistance, advanced driver assistance, and/or automated driving. Embodiments of the invention relate in particular to techniques useful in providing output that is based at least on several map layers.

BACKGROUND

Map data is a valuable resource for enhancing vehicle navigation functions, driver assistance systems, and enabling autonomous driving. It provides information about the roads, routes, and surroundings that empower these and other technologies to operate efficiently and safely. One of the advantages of electronic map data is that it can be updated in an ongoing basis (i.e., continually), to reflect changes such as road changes, construction sites, and/or traffic patterns. This ensures that navigation systems can provide drivers with the relevant guidance, reducing the likelihood of getting lost or encountering unexpected obstacles. Vehicle navigation functions, driver assistance systems, and autonomous driving systems also use electronic map data to enhance safety and improve driving comfort. Features like lane departure warnings, blind-spot detection, and adaptive cruise control can utilize the information provided by electronic maps to make informed decisions and provide timely alerts or interventions. For example, if the map data indicates a sharp curve ahead, the system can adjust the vehicle's speed or warn the driver to ensure safe maneuvering. Additionally, electronic map data can assist in identifying speed limits, traffic signs, and other road conditions, allowing driver assistance systems to act accordingly. Thus, electronic map data helps vehicles to execute appropriate actions, enhancing safety and overall efficiency.

There is a need in the art for techniques that provide enhanced flexibility in modifying map data.

SUMMARY

It is an object of embodiments of the invention to provide methods, systems, and/or machine-readable instruction code that provide enhanced flexibility in modifying map data. It is an optional object to provide techniques of modifying map data which do not require modifications of a map layer to be synchronized with other map layers and/or which improve freshness of map data provided for use by devices in performing map-based tasks.

According to embodiments of the invention, a method and machine-readable instruction code as recited in the independent claims are provided. The dependent claims define preferred and advantageous embodiments.

According to an aspect of the invention, a method of modifying map data is provided. The method comprises effecting, by a map layer provision system that provides map layer data, modifications of the map layer data. The map layer data comprises map object definitions. The map object definitions include references to parent layer map objects defined by one or several parent layers of the map layer and/or map objects defined by the map object definitions are referenced by child layer map object definitions in one or several child layers of the map layer. The modifications comprise at least one of a change of an existing map object definition of the map object definitions, an addition of a new map object definition to the map object definitions, a deletion of an existing map object definition from the map object definitions. The method comprises providing, by the map layer provision system, data indicative of the modifications in the map layer data for use in performing at least one action based at least on the map layer data as modified by the modifications, wherein the data indicative of the modifications are provided in a stream.

A stream refers to a flow of data, with the processing system being operative to process messages of the stream one after another. The relative timing between messages in the stream can be variable. The temporal characteristics of a stream means that a processing system that receives the stream is operative to process messages of the various streams even though the messages may arrive at irregular intervals and/or with different delays between them.

Various effects and advantages are associated with the method. Information on modifications of the map layer data are provided as a stream. Thus, it is not required that modifications made to the map layer data are performed in accordance with a previously agreed upon timing and/or are otherwise temporally aligned with modifications of other map layers. Outputting data indicative of a modification in a stream, responsive to the modification being made, provides enhanced data freshness.

The stream may comprise a sequence of messages. Each of the messages may be associated with one of the modifications. The map layer provision system may generate and output each of the messages in the sequence responsive to effecting the modification with which the message is associated.

Thereby, information on modifications in a map layer may be provided without having to align the provision in time with modifications made to other map layers and/or a previously agreed upon transmission schedule.

Each of the messages may comprise a unique identifier of a map object modified by the modification with which the message is associated.

Thereby, a stream processing that processes the stream can identify to which map object the respective modification pertains.

Alternatively or additionally, each of the messages may comprise version data for the map layer.

Thereby, versioning of the map layer data is facilitated. A stream processing that processes the stream and other streams indicative of modifications of other map layers can ensure consistency, with regard to versions of the map layer data, more easily.

The map layer provision system may output the messages in the sequence with a timing that is independent of modifications of parent layer map object definitions of the parent layer map objects and/or modifications of the child layer map object definitions.

Thereby, it is not required that modifications made to the map layer data are performed in accordance with a previously agreed upon timing and/or are otherwise temporally aligned with modifications of other map layers. Outputting data indicative of a modification in a stream, responsive to the modification being made, provides enhanced data freshness.

The map layer provision system may effect at least one first modification of the modifications responsive to at least one inconsistency of the map layer data with parent layer map object definitions of the parent layer map objects and/or the child layer map object definitions, wherein the at least one first modification rectifies the at least one inconsistency.

Thereby, referential integrity issues can be addressed. The quality of the map data is improved by mitigating the risk that map data with integrity issues are provided to a map data consumer.

The method may comprise receiving, by the map layer provision system, one or several parent layer streams indicative of modifications of parent layer map object definitions that define the parent layer map objects. The at least one inconsistency may comprise a referential inconsistency caused by at least one of the modifications of parent layer map object definitions.

Thereby, referential integrity issues can be addressed. The quality of the map data is improved by mitigating the risk that map data with integrity issues are provided to a map data consumer.

The stream and the one or several parent layer streams may be asynchronous.

Thereby, enhanced flexibility is attained in updating different map layers. The map layer and the one or several parent layers may be updated with different timing, resulting in different relative timing of messages in the stream and of messages in at least one of the parent layer streams.

The map layer provision system may be operative to effect at least one second modification of the modifications at a time that is independent of the modifications of parent layer map object definitions.

Thereby, enhanced flexibility is attained in updating different map layers. The map layer and the one or several parent layers may be updated with different timing, resulting in different relative timing of messages in the stream and of messages in at least one of the parent layer streams.

The at least one inconsistency may comprise a referential inconsistency caused by at least one of the modifications.

Thereby, referential integrity issues can be addressed. The quality of the map data is improved by mitigating the risk that map data with integrity issues are provided to a map data consumer.

The method may comprise receiving a notification indicative of the at least one inconsistency from a processing system. The processing system may process the stream to perform an integrity verification of the map layer data as modified by the modifications.

Thereby, feedback on potential integrity issues can be received by the map layer provision system. Receipt of the feedback from a processing system that performs stream processing of several streams allows a greater variety of integrity issues to be detected and rectified, e.g., by facilitating detection of referential integrity issues.

The method may comprise processing, by the processing system, the stream and the one or several parent layer streams to perform the integrity verification.

Thereby, the processing system can perform an integrity verification by analyzing, based on the stream and the one or several parent layer streams, modifications in the map layer and the one or several parent layers, as information on the modifications becomes available in the stream and the one or several parent layer streams. Integrity issues can, thus, be addressed in a timely manner.

The method may comprise providing, by the map layer provision system, an acknowledgment to another map layer provision system of at least one of the one or several parent layers to acknowledge rectification of the inconsistency by the at least one first modification.

Thereby, correction of integrity issues can be signaled to the other map layer provision system. This mitigates the risk of integrity issues while allowing different map layers to be handled by different map layer provision systems.

The method may comprise performing, by a stream processing system, a stream processing of the stream to generate an output stream of map data for use by a map data consumer (such as systems for route planning and/or route search, navigation, driver assistance, advanced driver assistance, and/or autonomous driving).

Thus, stream processing techniques can be employed to generate, based at least on the stream, an output stream of map data. This provides enhanced freshness of map data.

The stream processing may comprise an integrity verification operative to confirm that the modifications performed by the map layer system do not give rise to an integrity issue.

Thereby, the risk is mitigated that map data provided to a map data consumer are influenced by modifications that create an integrity issue. Quality of the map data is increased.

The stream processing may comprise a binding of several streams, wherein the several streams comprise the stream output by the map layer provision system and at least one other stream indicative of modifications of at least one other map layer (e.g., at least one of the parent and/or child layers). The binding may comprise combining information from several streams, processing messages of the several streams as they arrive and/or determining whether messages from different streams include information relating to a same map object that can be combined into an output stream message of an output stream of the binding.

Thereby, information from different streams may be combined in a stream processing, in which incoming messages are processed as they are received.

The binding may comprise generating output that comprises an output stream.

Thereby, the output stream is generated from the several streams.

The stream output by the map layer provision may comprise a first sequence of messages. The at least one other stream indicative of modifications of at least one other map layer may comprise a second sequence of messages. A message timing of the first sequence of messages may be independent of a message timing of the second sequence of messages.

Thereby, information on modifications in the map layer may be provided with a timing that depends on when the modifications in the respective map layer are performed, without requiring temporal alignment with the modifications in the parent layer(s) and/or child layers. This is beneficial for freshness of the output (e.g., map data provided to a map data consumer).

The stream processing may comprise processing the messages of the first sequence of messages one by one as they are received by the processing system. The stream processing may comprise processing the messages of the second sequence of messages one by one as they are received by the processing system.

Thereby, the processing system is operative to generate output (such as map data) by processing messages of the first sequence of messages and of the second sequence of messages as they arrive. This is beneficial for freshness of the output (e.g., map data provided to a map data consumer). It is not required for the processing system to await receipt of all messages of the first sequence of messages and of the second sequence of messages before it starts the processing (such as the integrity verification).

The first stream of messages may comprise a first message that provides information on a modification of the map layer triggered by a parent layer modification of a parent layer of the map layer, wherein a second message of the second sequence of messages provides information on the parent layer modification, wherein the first message is generated and output at a different time than the second message (e.g., with a delay that exceeds a processing time for making the child layer modification responsive to the parent layer modification).

Thereby, greater flexibility is attained in the timing at which the several map layers can be modified.

The stream processing may comprise generating an output message responsive to confirming that the first message and the second message pass the integrity verification.

Thereby, messages that provide information on modifications that are consistent with each other may be used to generate an output message without having to wait for any outstanding messages of the first sequence of messages and of the second sequence of messages. This is beneficial for freshness of the output (e.g., freshness of the map data) and/or for allowing sources of the several streams to operate independently. There is no need to maintain synchronization between the sources of the several streams. This increases scalability.

The stream processing may comprise triggering a corrective action responsive to detection of an inconsistency in the integrity verification.

Thereby, the risk is mitigated of output being affected by map layer data modified such that there is an integrity issue. The quality of the output (e.g., of map data) is improved thereby.

The stream processing may comprise storing, responsive to detection of the inconsistency, a data item that provides information on an inconsistency.

Thereby, the data item remains available to the stream processing for resolving the inconsistency, e.g., by waiting for at least one subsequent message in at least one of the several streams that resolved the inconsistency.

The data item may be stored at least temporarily after detection of the inconsistency.

Thereby, the data item remains available to the stream processing for resolving the inconsistency, e.g., by waiting for at least one subsequent message in at least one of the several streams that resolved the inconsistency.

The data item may be stored temporarily after detection of the inconsistency, and the method may comprise deleting, by the processing system, the data item in response to a deletion criterion (such as a time-based deletion criterion).

Thereby, the data item remains available to the stream processing for an inconsistency resolution in a time period after detection of the inconsistency, while freeing storage space for storing other data items in an ongoing manner (i.e., continually) as new inconsistencies are detected.

The data item may be or may be indicative of payload data in a message which is determined to give rise to the inconsistency.

Thereby, this information remains available to the stream processing for an inconsistency resolution in a time period after detection of the inconsistency.

The stream processing may comprise temporarily preventing, responsive to the inconsistency, the generation of an output message that is based on the message determined to give rise to the inconsistency.

Thereby, the risk of potentially incorrect output (such as map data) being provided is mitigated.

The stream processing may comprise monitoring, responsive to detection of the inconsistency, the several streams prior to triggering the corrective action.

Thereby, the several streams can be monitored to determine whether the inconsistency is remedied by another modification of another layer. The asynchronous nature of the messages in the several streams and/or the asynchronous nature of the modifications in the various map layers is thereby taken into account.

Monitoring the several streams may comprise ascertaining, based on the data item, that the inconsistency remains unaddressed by the modifications indicated by the several streams in a monitoring time interval after detecting the inconsistency.

Thereby, the several streams are monitored to determine whether the inconsistency is remedied by another modification of another layer. Quality of the output (e.g., of the map data) is enhanced thereby.

The stream processing may comprise generating an output message based at least one the data item responsive to ascertaining that the inconsistency is addressed by the modifications indicated by the several streams in a monitoring time interval after detecting the inconsistency.

Thereby, ascertaining that the inconsistency is resolved triggers the generation of an output message (such as an output message including map data based on at least two different layers of the several layers). This is beneficial for both accuracy and freshness of the output (e.g., map data).

The corrective action may comprise correcting, in a map object definition of the map layer, an incorrect reference to a map object in a different map layer.

Thereby, the stream processing is operative to trigger correction of referential integrity issues. This enhanced accuracy of the generated output (e.g., map data).

Alternatively or additionally, the corrective action may comprise receiving feedback by the map layer provision system based at least on the inconsistency.

Thereby, the stream processing is operative to trigger provision of feedback to allow the map layer provision systems to address the at least one inconsistency. This enhances accuracy of the generated output (e.g., map data).

The feedback may be received selectively when the map layer system was a source of at least one message gives rise to the inconsistency.

Thereby, the stream processing is operative to trigger provision of feedback to allow the map layer provision systems to address the at least one inconsistency. This enhances accuracy of the generated output (e.g., map data).

Alternatively or additionally, the corrective action may comprise changing a type of at least one of the modifications from a first type of modification to a second type of modification, wherein the at least one of the modifications is a root cause of the inconsistency, wherein changing the type resolves the inconsistency.

Thereby, correction of an incorrect modification may be implemented. This enhances accuracy of the generated output (e.g., map data).

The first type of modification and the second type of modification may each be selected from a group comprising an addition of an object definition, a deletion of an object definition, a change in an object definition.

Thereby, incorrect operations performed on a map layer may be corrected. This enhances accuracy of the generated output (e.g., map data).

The first type of modification and the second type of modification may each be selected from a group consisting of an addition of an object definition, a deletion of an object definition, a change in an object definition.

Thereby, incorrect operations performed on a map layer may be corrected. This enhances accuracy of the generated output (e.g., map data).

Alternatively or additionally, the corrective action may comprise discarding a duplicate of a map object creation, a duplicate of a map object deletion, and/or a modification of a non-existing map object.

Thereby, certain types of incorrect operations performed on a map layer may be handled in a manner which reduces the risk of them adversely impacting the output (e.g., map data).

Generating, by the processing system, the output may comprise aggregating at least two modifications of map object definitions relating to a same map object into an aggregate modification. The output may be based at least on the aggregate modification, wherein the aggregating is performed based at least on a result of the integrity verification.

Thereby, output (such as map data for use by a map data consumer) may be generated that combines information from the several map layers. The stream processing that comprises an integrity verification provides benefits both with regard to freshness and quality (e.g., accuracy) of the output.

The integrity verification may comprise a referential integrity verification that checks that modifications of the child layer map object definitions are referentially consistent with the map object definitions.

Thereby, the stream processing is used to mitigate the risk that referential integrity issues adversely affect the quality of the output (e.g., map data).

Alternatively or additionally, the integrity verification may comprise a logical integrity verification.

Thereby, the stream processing is operative to mitigate the risk that logical integrity issues adversely affect the quality of the output (e.g., map data). The logical integrity issues may comprise integrity issues that exist within a layer and are not dependent on references between layers.

Alternatively or additionally, the integrity verification may comprise a syntactical integrity verification. The syntactical integrity verification may comprise verifying that the child layer map object definitions and the parent layer map object definitions, respectively modified as indicated by the several streams, are in conformity with a set of syntactical rules, logical rules, and/or other rules that do not necessarily depend on referential integrity between different map layers.

Thereby, the stream processing is operative to mitigate the risk that syntactical integrity issues adversely affect the quality of the output (e.g., map data).

The map layer and the one or several parent layers and/or the one or several child layers may define an acyclic graph.

Thereby, flexibility is attained in the references between map layers that are supported.

The acyclic graph may comprise a base map layer defining nodes and links of a navigable network.

Thereby, the basic geometry of a network of navigable links are defined and can be referenced by other map layers.

The base map layer may define coordinates (such as latitude and longitude, without being limited thereto) of the nodes.

Thereby, the positions of nodes of a network of navigable links are defined and can be referenced by other map layers.

The base map layer may define ways (such as navigable links) which include one or several of the nodes.

Thereby, the navigable links are defined and can be referenced by other map layers.

The acyclic graph may define a hierarchical map layer structure that comprises the base map layer at a root.

Thereby, dependencies between map layers can be organized in a hierarchical manner, which may facilitate prioritization of modifications.

The acyclic graph may comprise one or several map layers referencing the base map layer and comprising one, several, or all of: a turn restrictions layer; a speed limits layer; a speed profile layer; a one way layer; a blocked passages layer; a buildings layer; an address points layer; a points of interest layer; a parking information layer; a point of interest layer.

Thereby, information useful for performing various tasks associated with route search, navigation, driver assistance, advanced driver assistance, and/or autonomous driving can be harnessed to generate the output.

The acyclic graph may comprise one or several map layers referencing the base map layer and being selected from a group consisting of: a turn restrictions layer; a speed limits layer; a speed profile layer; a one way layer; a blocked passages layer; a buildings layer; an address points layer; a points of interest layer; a parking information layer; a point of interest layer.

Thereby, information useful for performing various tasks associated with route search, navigation, driver assistance, advanced driver assistance, and/or autonomous driving can be harnessed to generate the output.

The output may comprise an output stream. The output stream may comprise a sequence of output messages.

Thereby, the stream processing is operative to provide the output stream based at least on the stream provided by the map layer provision system. This is beneficial for freshness of the output (e.g., map data), as output is made available once messages from the several streams have been checked by the integrity verification, aggregated (where applicable), and/or used for correcting referential integrity or other issues.

The processing system may receive several streams. The several streams may comprise the stream provided by the map layer provision system. The several streams may comprise one or several other streams provided by one or several other map layer provision systems (such as several distinct map layer provision systems).

Thereby, different map layers may be handled by different map layer provision systems, further enhancing the flexibility in modifying the several map layers is enhanced.

Each of the several map layer provision systems may be associated with a different one of the several map layers.

Thereby, the different map layers may be provided by different map layer provision systems, further enhancing the flexibility in modifying the several map layers is enhanced.

The several map layer provision systems may be operative to implement modifications of map object definitions in different map layers independently of each other.

Thereby, the different map layers may be provided by different map layer provision systems, further enhancing the flexibility in modifying the several map layers is enhanced.

Generating the output may comprise generating first output for a first map product and second output for a second map product.

Thereby, different map products may be generated based on the several streams.

The integrity verification may be performed separately for the first map product and the second map product.

Thereby, the stream processing can take into account that different streams may be required for generating the first map product and the second map products. Alternatively or additionally, the stream processing can take into account that different requirements may exist with regard to, e.g., freshness and/or quality (e.g., accuracy) of the first and second map products, so that different integrity verification instances are useful.

The method may comprise triggering or performing at least one action based at least on the output.

Thereby, the output (e.g., an output stream providing map data) is used for performing one or several actions.

The at least one action may comprise at least one control action performed by at least one map data consumer responsive to the output.

Thereby, the output (e.g., an output stream providing map data) is used for performing one or several control actions.

The action may comprise one, several or all of a route search, a route guidance, a driver assistance function, an advanced driver assistance function, an automated driving function, a traffic flow control.

Thereby, the output (e.g., an output stream providing map data) is used for performing vehicle- or other navigation-related functions.

According to another aspect of the invention, there is disclosed machine-readable instruction code comprising instructions which, when executed by at least one processing circuit, cause the at least one processing circuit to perform the method of any one aspect or embodiment.

According to another aspect of the invention, there is disclosed a data carrier comprising machine-readable instruction code comprising instructions which, when executed by at least one processing circuit, cause the at least one processing circuit to perform the method of any one aspect or embodiment.

The data carrier may comprise a non-transitory storage medium having stored thereon the machine-readable instruction code.

According to a further aspect, there is provided a map layer provision system for modifying map data. The map layer provision system is operative to provide map layer data. The map layer provision system is operative to effect modifications of the map layer data. The map layer data comprises map object definitions. The map object definitions include references to parent layer map objects defined by one or several parent layers of the map layer and/or map objects defined by the map object definitions are referenced by child layer map object definitions in one or several child layers of the map layer. The modifications comprise at least one of a change of an existing map object definition of the map object definitions, an addition of a new map object definition to the map object definitions, a deletion of an existing map object definition from the map object definitions. The map layer provision system comprises at least one interface operative to provide data indicative of the modifications in the map layer data for use in performing at least one action based at least on the map layer data as modified by the modifications, wherein the data indicative of the modifications are provided in a stream.

Various effects and advantages are associated with the map layer provision system. The map layer provision system is operative such that information on modifications of the map layer data is provided as a stream. Thus, it is not required that the map layer provision system makes modifications to the map layer data in accordance with a previously agreed upon timing and/or in a manner that is otherwise temporally aligned with modifications of other map layers. Outputting data indicative of a modification in a stream, responsive to the modification being made, provides enhanced data freshness.

The map layer provision system may be operative to perform the method of any aspect or embodiment disclosed herein.

The processing system may be operative to perform the method of any aspect or embodiment disclosed herein.

According to a further aspect, there is provided a system which comprises the map layer provision system, a processing system, and at least one map data consumer. The processing system is operative to perform stream processing of the stream to generate output for use by the at least one map data consumer.

Thereby, the output (e.g., map data) is made available for use by the map data consumer using stream processing techniques. The map data consumer may be or may comprise a device or vehicle system operative to perform, based at least on the output, one, several or all of a route search, a route guidance, a driver assistance function, an advanced driver assistance function, an automated driving function, a traffic flow control.

The at least one map data consumer may comprise a control circuit operative to control a vehicle actuator.

Thereby, the output (e.g., map data) is made available for vehicular control operations.

Alternatively or additionally, the control circuit may be operative to control a human machine interface based at least on the output.

Thereby, the output (e.g., an output stream providing map data) is used for performing vehicle- or other navigation-related functions.

The system may comprise one or several other map layer provision systems, each operative to provide a stream indicative of modifications to one or several other map layers. Each of the other map layer provision systems may be associated with at least one (e.g., with exactly one) map layer.

Thereby, further enhanced flexibility is attained for modifying map data.

The map layer provision system and/or the one or several other map layer provision systems may comprise at least one map layer provision system operative to effect modifications of map layer data based on observations (e.g., of links of a navigable network, traffic signs, and/or traffic conditions) captured using sensing equipment. The sensing equipment may be installed in fleet of probes, such as vehicular probes.

Thereby, suitable modifications of map layers that improve the quality of the output (e.g., the accuracy of the output as compared to real-life infrastructure conditions) may be performed, e.g., automatically.

The map layer provision system and the one or several other map layer provision systems asynchronous manner, i.e., without temporal alignment.

Thereby, modifications in a map layer may be implemented without requiring the map layer provision system to temporally align with the one or several other map layer provision systems. This is beneficial for freshness of the provided output.

The several map layer provision systems may be operative such that the stream of the several streams that is associated with the child layer may comprise a first sequence of messages. The several map layer provision systems may be operative such that the at least another one of the several streams that is associated with the one or several parent layers may comprise a second sequence of messages. The several map layer provision systems may be operative such that a message timing of the first sequence of messages is independent of a message timing of the second sequence of messages.

According to a further embodiment, there is disclosed a use of the method, the map layer provision system, and/or the machine-readable instruction code for generating map data for use by map data consumers, wherein the map data is based at least on the stream.

According to a further embodiment, there is disclosed a method of performing a control operation onboard a vehicle based on map data, wherein the map data is based on the stream generated using the method of modifying map data, the map layer provision system, or the machine-readable instruction code.

The control operation may comprise an actuator control operation.

While the techniques disclosed herein may be used for navigation, route search, driver assistance and autonomous driving functions, they are not limited thereto.

BRIEF DESCRIPTION OF THE DRAWINGS

Embodiments of the invention will be described with reference to the drawings in which similar or corresponding reference signs designate elements having similar or corresponding configuration and/or function.

FIG. 3 is a schematic functional representation of at least one processing circuit of the processing system.

FIG. 4 is a schematic functional representation of at least one processing circuit of the processing system.

DETAILED DESCRIPTION OF EMBODIMENTS

Figure 1:
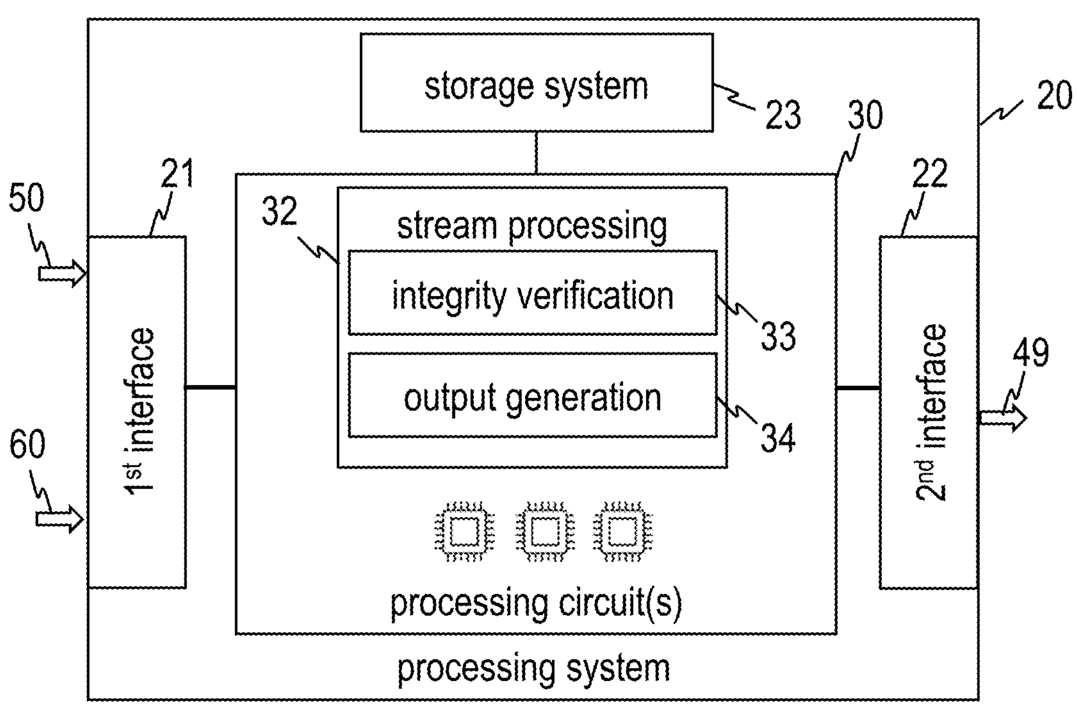
FIG. 1 is a schematic representation of a processing system operative to perform a method of modifying map data.

Embodiments of the invention will be described in detail. While some embodiments will be described in association with specific exemplary map layers, the embodiments are not limited thereto.

The features of embodiments may be combined with each other unless specifically stated otherwise.

The techniques disclosed herein in detail may be used to modify map data. The map data may be based on several map layers. The techniques disclosed herein are operative to provide map data based on map layers. The techniques disclosed herein may be operative to provide different types of map data, such as map data for different sets of vehicles and/or different purposes (such as vehicular navigation and non-vehicular navigation).

The availability of different map layers in electronic map data is useful for a variety of applications. Different map layers can be combined to generate output, making it possible to customize the map data based on the needs of the specific applications. Examples for such map layers include road network elements, restrictions (such as speed limits, turning restrictions, etc.) points of interest, street names, names of points of interest, without being limited thereto. The availability of multiple map layers is beneficial for providers of map data, as it provides opportunities for customization.

Different map layers may be maintained by and/or under the control of different map layer providers. This has various benefits, such as being able to utilize a provider's data quality and/or freshness for a map layer (such as restrictions) and using another provider's data quality and/or freshness for another map layer (such as points of interest or names). When different map layers are being taken care of by and/or under the control of different map layer providers, it is conventionally important that modifications in different map layers be performed in a coordinated manner to ensure consistency. This can be done by implementing modifications in a synchronized manner. However, such an approach restricts the flexibility in updating individual map layers. Such an approach may also require modifications of some map layers to be postponed until map layers can be updated in a synchronized manner.

The techniques discloses herein are operative to provide a stream of map data based on modifications of a map layer. The techniques disclosed herein are operative such that modifications of a map layer are effected and data is provided in a stream to indicate the modifications made. Different streams may be generated for different map layers. A stream processing may be performed to process the several streams and thereby generate output, such as a stream of map data. The stream-based techniques may reduce or even eliminate the need for synchronizing modifications in the various map layers with each other. A modification of one of the map layers can, however, still be caused by a modification in a different one of the map layers.

As used herein, a "stream" refers to a flow of data, with the stream processing being operative to process messages of the stream one after another. A relative timing of messages in the stream can be variable. The variability exists both within a stream but also between different streams. Thus, the streams may comprise several streams distinguished from each other by a relative timing of messages (e.g., different delays between successive messages in the various streams). The stream processing receives messages from each of the streams in an ongoing basis (i.e., continually).

As used herein, streams are referred to as "asynchronous" when the relative timing of messages in the streams is different.

As used herein, a "stream processing" involves processing and analyzing messages are they are being received. Instead of waiting for batch processing, stream processing enables messages including information on modifications of map layers, as reflected by messages included in the received streams, to be processed as they arrive. This reduces a time delay between receipt of a message as input of the stream processing and provision of a message of an output of the stream processing. The temporal aspect of streams means that the processing system is operative to process messages of the various streams even though the messages may arrive at irregular intervals and/or with different delays between them.

As used herein, a "processing system" operative to perform a stream processing may be implemented as a distributed system, e.g., as a distributed architectures to handle the volumes of incoming data.

As used herein, an "output" of the stream processing may comprise an output stream. The output stream may comprise output messages which may have varying delay between successive output messages. The output may comprise map data for use by map data consumers and/or may be operative for providing map data to map data consumers. The output may comprise output messages that include aggregate information from at least two different map layers.

The stream processing may comprise a binding. As used herein, a "binding" may comprise combining information from several streams, using a stream processing that comprises processing messages of the several streams as they arrive and determining whether messages from different streams include information relating to a same map object that can be combined into an output stream message of an output stream of the binding.

As used herein, a "map data consumer" refers to any device or system operative to process map data to perform an action. Examples for map data consumers include portable communication terminals (such as smartphones), vehicle processing systems, vehicles, navigation devices, wearables, without being limited thereto. The map data consumer may be operative to perform a control action to control, e.g., a vehicle actuator and/or a human machine interface (HMI).

As used herein, "map layer provision systems" operate as sources of the several streams. The map layer provision systems may but do not need to be implemented in separate hardware. The map layer provision systems may be implemented in a distributed architecture, which may optionally also implement the stream processing.

As used herein, a "map object definition" refers to a definition included in at least one of the map layers. There may be different types of map object definitions, such as a first type (e.g., for defining nodes of a navigable network), a second type (e.g., for defining links of the navigable network), and a third type (e.g., for defining information related to objects of the first or second types or of other objects of the third type). Map object definitions of the first type (e.g., "node type") may define coordinates (such as latitude and longitude, without being limited thereto) of the respective node. Map object definitions of the second type (e.g., "way type") may define at least which node(s) is/are part of a way; it is noted that a "way" can also reasonably be defined by a single node, optionally in association with attributes, e.g., when the way defines a turning area or roundabout. Map object definitions of a third type (which may also be referred to as relation) can define characteristics such as names that may be associated with objects of the first or second type or even the third type (such as a name of a point of interest (POI)) and can, thus, reference objects of any of the first, second, or third types. Other map object definitions may be used.

As used herein, a "modification" of a map object definition may be either one of an addition of a new map object definition, a deletion of an existing map object definition, the change of an existing map object definition.

As used herein, a "syntactical" integrity refers to syntax in the field of databases, rather than the field of linguistics.

FIG. 1 is a schematic representation of a processing system 20 operative to perform a method of modifying map data.

The processing system 20 comprises at least one interface 21 operative to receive several streams 50, 60. The processing system 20 comprises at least one processing circuit 30 operative to perform a stream processing 32. The at least one processing circuit 30 may comprise any one or any combination of integrated circuits, integrated semiconductor circuits, processors, controllers, application specific integrated circuits (ASICs), field programmable gate arrays (FPGAs), circuit(s) including quantum bits (qubits) and/or quantum gates, without being limited thereto.

Each of the streams 50, 60 comprises a plurality of messages. It is not required that the messages in the streams 50, 60 the received with a given timing. The several streams 50, 60 may be asynchronous in the sense that the timing and even the relative timing of messages in the different streams 50, 60 is not need to be aligned. The messages in each of the several streams 50, 60 are indicative of modifications of a map layer. Each of the several streams 50, 60 may include messages indicative of modifications of a single map layer only. Different streams 50, 60 may relate to different ones of several map layers.

The processing system 20 is generally operative to process the streams 50, 60 by performing the stream processing 32. The stream processing 32 is operative to process messages of the streams 50, 60 as they are being received by the processing system 20. It is not required that all messages be received prior to generating output, by the processing system 20, based at least on the payload data of already received messages of the streams 50, 60.

The function of the stream processing 32 is to provide output 49, which may preferably include an output stream, that aggregates information on modifications of different map layers. To this end, the stream processing 32 may be operative to identify messages in a same and/or different ones of the several streams 50, 60 that relate to a same map object (e.g., to a same node, a same way, a same point of interest, a same restriction, without being limited thereto) and generate an output message of the output stream that aggregates this information. Stream processing techniques such as a use of a sliding window may be employed to balance the aggregation of information and timeliness of the provision of an output message.

Thus, the stream processing 32 provides output 49 that is based on information on several map layers, respectively modified as indicated by the several streams 50, 60. Such output 49 may be useful for inclusion in map data that is provided to map data consumers.

The stream processing 32 comprises an integrity verification 33. The integrity verification 33 is operative to determine whether a modification of at least one map layer, as indicated by at least one of the streams 50, 60, gives rise to an inconsistency. Depending on the integrity verification implementation, the integrity verification 33 may be operative to determine whether a modification of at least one map layer, as indicated by at least one of the streams 50, 60, gives rise to an inconsistency between different map layers. This may happen when an object is deleted from a map layer may being still referenced by another objects in another map layer. Such an inconsistency between different map layers may also exist when an object is created in a map layer that references another object that does not or no longer exist in another map layer. The stream processing 32 and, in particular, the integrity verification 33 may alternatively or additionally be operative to detect, based on the several streams 50, 60, whether there is an inconsistency within at least one of the map layers. Examples for such inconsistencies include syntactical inconsistencies (in which modifications are not conformant to an existing set of syntactical rules with which the various map layers and having to comply) and/or logical inconsistencies (such as a duplicate creation of an already existing map object).

The stream processing 32 comprises an output generation 34. The output generation 34 may be operative to generate a stream of output messages. The output generation 34 may be operative such that at least some of the output messages include information aggregated from several ones of the different streams 50, 60 received at the at least one interface 21. The output generation 34 may alternatively or additionally be operative such that the output 49 comprises feedback informing map layer provision systems of a detected inconsistencies. The feedback or other output 49 may be operative to perform or to trigger a corrective action responsive to a detected inconsistency.

The processing system 20 may comprise at least one further interface 22 to output the output stream and/or feedback and/or other output that causes a corrective action to be performed. Alternatively or additionally, the processing system 20 may be operative to output the output stream and/or feedback and/or other output that causes the corrective action to be performed over the at least one interface 21 over which the several streams 50, 60 are received. The processing system 20 may comprise an interface that is operative to both receive the several streams and to provide the output.

The processing system 20 comprises a storage system 23. The storage system 23 is operative to at least temporarily store data items useful to perform the integrity verification 33. For illustration, as will be explained in more detail herein, the integrity verification 33 may be operative to, responsive to detection of an inconsistency, cause a data item to be stored in the storage system 23, with the data item being indicative of or otherwise based on a message determined to cause the inconsistency. Thereafter, the integrity verification 33 may process additional messages received in other streams and/or a same stream that included the message causing the inconsistency, to determine whether any of the additional messages indicates a modification that resolves the inconsistency. Thereby, the asynchronous character of the various streams 50, 60 can be accommodated without having to take excessive corrective actions. In particular, temporarily existing inconsistencies indicated by the several streams 50, 62 do not affect the quality of the map data provided to map data consumers if the processing system 20 holds of on generating an output message based on a message determined to cause an inconsistency.

The storage system 23 or a storage system separate therefrom may store machine-readable instruction code which, when executed by the at least one processing circuit 30, causes the processing system 20 to perform the method of modifying map data.

Figure 2:
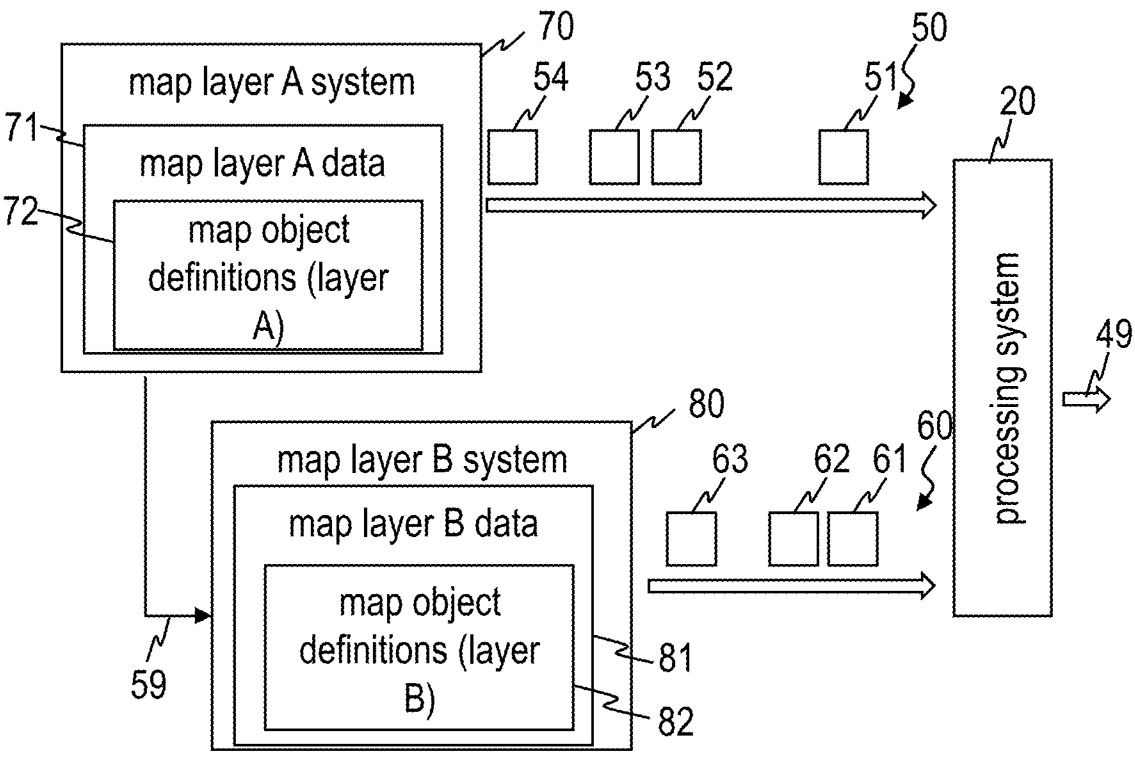
FIG. 2 is a schematic representation of a system comprising the processing system.

FIG. 2 shows a schematic representation of a system that comprises a map layer provision system 70 operative to provide a stream 50 of the several streams 50, 60 obtained by the processing system 20, another map layer provision system 80 operative to provide another streams 60 of the several streams 50, 60, and the processing system 20 operative to perform stream processing of the several streams 50, 60.

The map layer provision system 70 is operative to maintain data 71 for a map layer, which is also referred to as map layer A in the following description. The map layer data 71 includes map object definitions 72. The map object definitions 72 may include definitions of components of a navigable network (such as nodes and/or links of the navigable network) or information that is associated with such components, such as restrictions, names, street names, points of interest, without being limited thereto. The map layer provision system 70 is operative to modify the map object definitions 72. The map layer provision system 70 may be operative to perform modifications which may be any one or any combination of: an addition of a new map object definition, a deletion of an existing map object definition, the change of an existing map object definition.

The map layer provision system 70 is operative to maintain versioned map layer data. Modifications in map object definitions 72 may cause the version to change. Information on the respective version may be provided by the map layer provision system 70 to the processing system 20, for example as part of the messages of the stream 50, and/or the other map layer provision system 80.

The map layer provision system 70 is operative to generate the stream 50 including a plurality of messages 51, 52, 53, 54. A time delay between successive ones of the messages 51, 52, 53, 54 may be variable. I.e., the stream 50 may include successive messages separated in time by a given time delay and other successive messages separated in time by another time delay different from the given time delay. The map layer provision system 70 may be operative such that, responsive to modifying a map object definition of the map object definitions 72, it generates and outputs an associated message of the stream 50. The map layer provision system 70 may be operative such that a message of the stream 50 providing information on a modification performed to the map object definitions 72 may be output in the stream 50 without the map layer provision system 70 aligning a timing of the message with any modifications and/or any message outputting by the other map layer provision system 80.

The map layer provision system 70 may also be operative to inform the other map layer provision system 80 of a version of its map layer data and/or of the modification that it made. In other words, the messages of the stream 50 or other information relating to the modifications made by the map layer provision system 70 may also be provided to the other map layer provision system 80. To this end, the different map layer provision systems 70, 80 may be communicatively interfaced via at least one communication link 59.

The other map layer provision system 80 is operative to maintain data 81 for another map layer, which is also referred to as map layer B in the following description. The other map layer data 81 includes other map object definitions 82. The other map object definitions 82 may include information that is associated with such components, such as restrictions, names, street names, points of interest, without being limited thereto. The other map layer provision system 80 is operative to modify the other map object definitions 82. The other map layer provision system 80 may be operative to perform modifications which may be any one or any combination of: an addition of a new map object definition, a deletion of an existing map object definition, the change of an existing map object definition.

The other map layer provision system 80 is operative to maintain versioned map layer data. Modifications in the other map object definitions 82 may cause the version to change. Information on the respective version may be provided by the other map layer provision system 80 to the processing system 20, for example as part of the messages of the other stream 60, and/or the map layer provision system 70.

The other map layer provision system 80 may be operative to specify the version of the map data of the map layer provision system 70 (such as the version of the map object definitions 72) to which a modification in the other map object definitions 82 refers and/or to which the map layer provision system 80 refers when generating a message of a stream output by the map layer provision system 70.

The other map layer provision system 80 is operative to generate the other stream 60 including a plurality of messages 61, 62, 63, 64. A time delay between successive ones of the messages 61, 62, 63, 64 may be variable. I.e., the other stream 60 may include successive messages separated in time by a given time delay and other successive messages separated in time by another time delay different from the given time delay. The other map layer provision system 80 may be operative such that, responsive to modifying a map object definition of the other map object definitions 82, it generates and outputs an associated message of the other stream 60. The other map layer provision system 80 may be operative such that a message of the other stream 60 providing information on a modification performed to the other map object definitions 82 may be output in the other stream 60 without the other map layer provision system 80 aligning a timing of the message with any modifications and/or any message outputting by the map layer provision system 70. The other map layer provision system 80 may be operative such that a message of the other stream 60 providing information on a modification performed to the other map object definitions 82 includes information on a version of the data of the map layer provision system 70 (such as the version of the map object definitions 72) to which the modification refers.

The other map layer provision system 80 may optionally also be operative to receive from the map layer provision system 70 information on a version of map layer data and/or of any modification that was made by the other map layer provision system 70. The other map layer provision system 80 may be operative to acknowledge such information on modifications received from the map layer provision system 70, via, e.g., the at least one communication link 59.

FIG. 3 is a functional representation of stream processing 32 that may be performed by the processing system 20. The integrity verification 33 may comprise a referential integrity verification 35. The referential integrity verification 35 is operative to detect inconsistencies between different map layers caused by a modification of at least one of the map layers, as indicated by the several streams 50, 60. The referential integrity verification 35 may be operative to determine, based on the received several streams, whether one of the messages included in the several streams 50, 60 indicates deletion of a map object that is referenced by an existing, modified or newly created map object definition in another map layer, as also indicated by the several streams 50, 60. Alternatively or additionally, the referential integrity verification 35 may be operative to determine, based on the received several streams, with one of the messages included in the several streams 50, 60 indicates a change or addition of a map object definition that references another, previously deleted map object. Alternative or additional referential integrity checks may be performed by the referential integrity verification 35.

The output generation 34 may comprise generating 36 the output based on a result of the referential integrity verification. The result of the referential integrity verification may be used in various ways when generating the output. For illustration, information on a modification received in the several streams 50, 60 may be used for generating an output message of an output stream for use by a map data consumer selectively dependent on whether the referential integrity verification verified that the modification that do not give rise to a referential integrity issue. Alternatively or additionally, the result of the referential integrity verification may be used to determine whether information on a modification received of the several streams 50, 60 is to be used for generating an output message of the output stream for use by a map data consumer without delay or after a wait period which allows the additional messages of the several streams 50, 60 to be checked to determine whether a detected inconsistency is remedied. Alternatively or additionally, the result of the referential integrity verification may be used to generate feedback that causes rectification of the referential integrity issue.

Alternatively or in addition to performing a referential integrity verification and generating output based on a result of the referential integrity verification, the stream processing may perform one or several other integrity verifications, such as a logical and/or syntactical integrity verification.

FIG. 4 is a functional representation of stream processing 32 that may be performed by the processing system 20. The integrity verification 33 may comprise a logical and/or syntactical integrity verification 37. The logical and/or syntactical integrity verification 37 is operative to detect modifications that cause logical issues and/or syntactical issues, such as the generation of duplicate map objects and/or non-adherence to syntactical rules with which the map layers must comply. The logical and/or syntactical integrity verification 37 may be operative to detect creation of a duplicate of an already existing map object. Alternative or additional logical and/or syntactical integrity checks may be performed by the logical and/or syntactical integrity verification 37.

The output generation 34 may comprise generating 38 the output based on a result of the logical and/or syntactical integrity verification. The result of the logical and/or syntactical integrity verification may be used in various ways when generating the output. For illustration, information on a modification received in the several streams 50, 60 may be used for generating an output message of an output stream for use by a map data consumer selectively dependent on whether the logical and/or syntactical integrity verification verified that the modification that do not give rise to a logical and/or syntactical integrity issue. Alternatively or additionally, the result of the logical and/or syntactical integrity verification may be used to determine whether information on a modification received of the several streams 50, 60 is to be used for generating an output message of the output stream for use by a map data consumer without delay or after a wait period which allows the additional messages of the several streams 50, 60 to be checked to determine whether a detected inconsistency is remedied. Alternatively or additionally, the result of the logical and/or syntactical integrity verification may be used to generate feedback that causes rectification of the logical and/or syntactical integrity issue.

The various map layers may form an acyclic graph. A map layer of the map layers may include map object definitions that refer to map objects defined by a different map layer. For illustration, a restrictions layer, such as a speed limits layer, a turning restrictions layer, a blocked passages layer, a one-way street layer, etc., may define the respective restriction with reference to a way or a node defined by a different map layer. For further illustration, a points of interest layer may define points of interest with reference to of a node defined by different map layer. For still further illustration, a names layer may define names for points of interest defined by different layer (the points of interest layer) and/or for ways defined by the another layer (such as a base map layer). It is such a dependency that can give rise to referential integrity issues.

Figure 5:
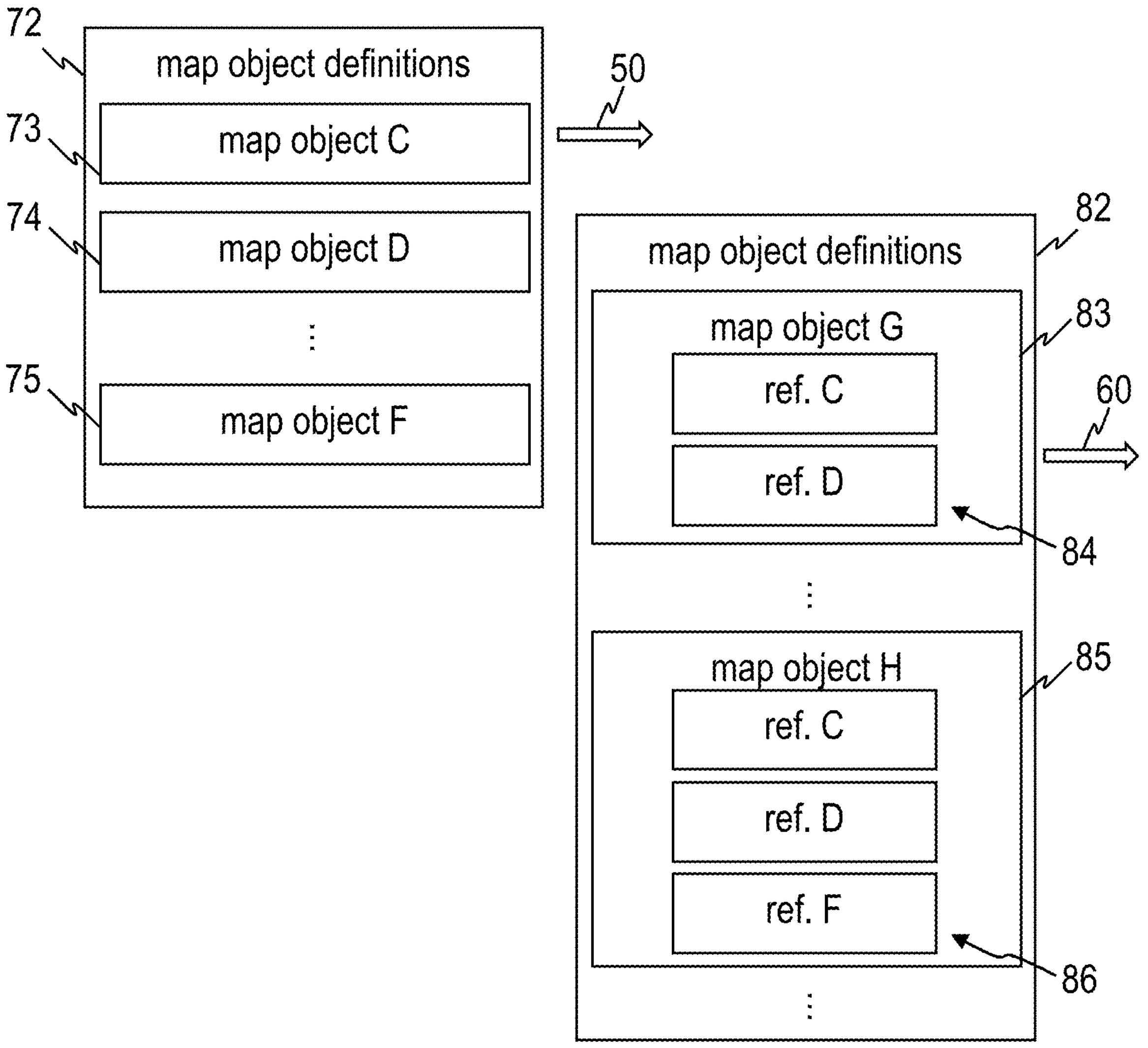
FIG. 5 is a schematic representation of map layers.

FIG. 5 is schematically illustrates that the map object definitions 72 of a map layer define various map objects 73, 74, 75. The map object definitions 82 of a different map layer defining other map objects 83, 85, which include references 84, 86 to the map object definitions 73, 74, 75. Modifications of the map object definitions 73, 74, 75 or modifications of the other map object definitions 83, 85 may create referential integrity issues, which can be detected by the processing system 20 using a stream processing techniques.

Figure 6:
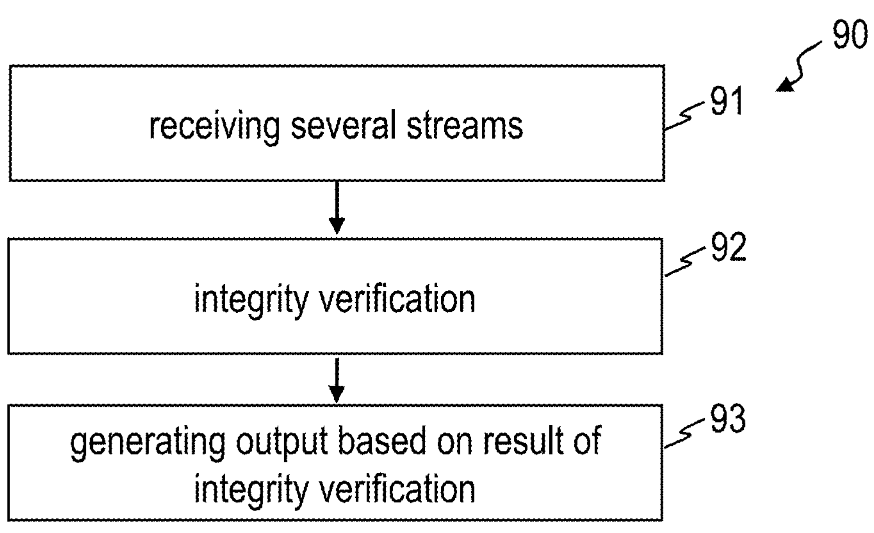
FIG. 6 is a flow chart of a method.

FIG. 6 is a flow chart of a method 90. The method 90 may be performed automatically by the processing system 20.

At process block 91, the processing system 20 receives the several streams. Each of the several streams is indicative of modifications of map layer data of a map layer with which the respective stream is associated. The processing system 20 performs stream processing of the several streams. The stream processing allows an output message of an output stream to be generated, or generation of the output message to be started, based on processing of one or several messages included in the received streams, without having to wait for subsequent messages in the several streams.

At process block 92, an integrity verification is performed by the processing system. The integrity verification may comprise a referential integrity verification. The referential integrity verification may comprise determining, based on the several streams, whether the several streams are indicative of a modification of at least one of the map layers that creates a referential integrity issue, such as a reference to a non-existing map object in a different map layer. Alternatively or additionally, the integrity verification may comprise a logical verification. The logical verification may comprise checking whether the several streams include at least one message indicative of a generation of a duplicate of an already existing map object. The logical verification may comprise a syntactical verification, in which the processing system checks whether the several streams include information on a modification that is not in conformity with syntactical rules with which the map layers are to comply.

At process block 93, the processing system 20 generates output. The output generation is based at least on a result of the integrity verification. The result of the referential integrity verification may be used in various ways when generating the output. For illustration, information on a modification received in the several streams 50, 60 may be used for generating an output message of an output stream for use by a map data consumer selectively dependent on whether the referential integrity verification verified that the modification that do not give rise to a referential integrity issue. Alternatively or additionally, the result of the referential integrity verification may be used to determine whether information on a modification received of the several streams 50, 60 is to be used for generating an output message of the output stream for use by a map data consumer without delay or after a wait period which allows the additional messages of the several streams 50, 60 to be checked to determine whether a detected inconsistency is remedied. Alternatively or additionally, the result of the referential integrity verification may be used to generate feedback that causes rectification of the referential integrity issue.

Alternatively or additionally, at process block 93, the result of the logical and/or syntactical integrity verification may be used in various ways when generating the output. For illustration, information on a modification received in the several streams 50, 60 may be used for generating an output message of an output stream for use by a map data consumer selectively dependent on whether the logical and/or syntactical integrity verification verified that the modification that do not give rise to a logical and/or syntactical integrity issue. Alternatively or additionally, the result of the logical and/or syntactical integrity verification may be used to determine whether information on a modification received of the several streams 50, 60 is to be used for generating an output message of the output stream for use by a map data consumer without delay or after a wait period which allows the additional messages of the several streams 50, 60 to be checked to determine whether a detected inconsistency is remedied. Alternatively or additionally, the result of the logical and/or syntactical integrity verification may be used to generate feedback that causes rectification of the logical and/or syntactical integrity issue.

Generating the output at process block 93 may comprise generating an output stream for use by at least one map data consumer. Generating the output stream may comprise including information from messages received in the several streams 50, 60 in output messages of the output stream selectively depending on confirming, in the integrity verification at process block 92, the there are no integrity issues.

Generating the output at process block 93 may also comprise generating output that triggers a corrective action, such as generating feedback to at least one map layer determined to be involved in an integrity issue to trigger correction.

Figure 7:
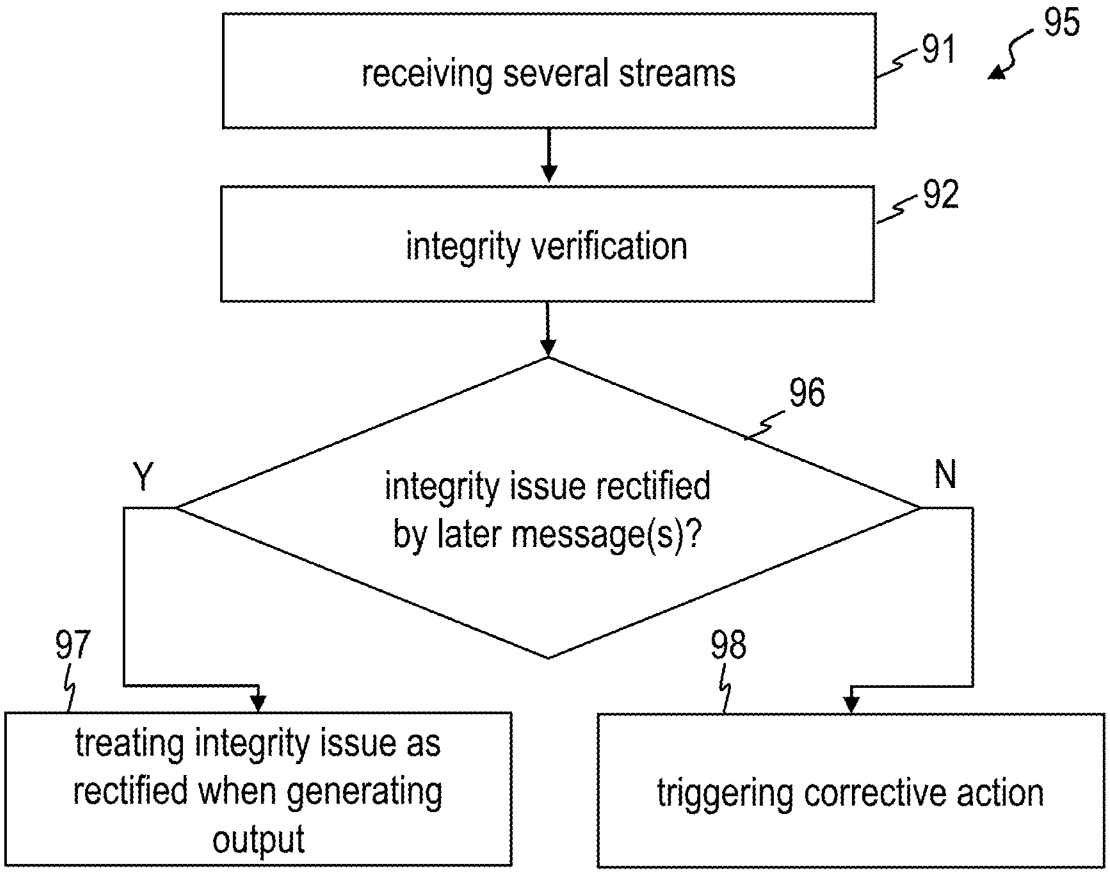
FIG. 7 is a flow chart of a method.

FIG. 7 is a flow chart of a method 95. The method 95 may be performed automatically by the processing system 20. Process blocks 91 and 92 may be performed as described with reference to FIG. 6.

At process block 96, responsive to identifying an integrity issue (such as a referential integrity issue) in the integrity verification at process block 92, the processing system 20 does not immediately initiate the process of triggering a corrective action that performs additional processing. More specifically, at process block 96, the processing system 20 determines whether messages received in the several streams 50, 60 within a time period after detection of the integrity issue show that the integrity issue is already rectified by at least one other modification of, for example, the map layer from which the message causing the integrity issue originated and/or a map layer different from the map layer from which the message causing the integrity issue originated. This processing is operative to take into account the asynchronous nature of the several streams 50, 60. Implementations of the processing at process block 96 may be described in more detail with reference to FIG. 8, FIG. 9, FIG. 10, and FIG. 30.

At process block 97, if it is determined at process block 96 that one or several other messages received in the time period after detection of the integrity issue show that the integrity issue was already addressed, the processing system 20 is operative to treat the integrity issue is rectified when generating the output. In this case, the processing system 20 can generate output messages of an output stream for use by a map data consumer without having to generate feedback that triggers a corrective action, for example.

At process block 98, if it is determined at process block 96 that messages received in the time period after detection of the integrity issue to not indicate that the integrity issue was already addressed, the processing system 20 can be operative to trigger a corrective action. The corrective action may comprise a provision of feedback to one or several of the map layers involved in the integrity issue.

Figure 8:
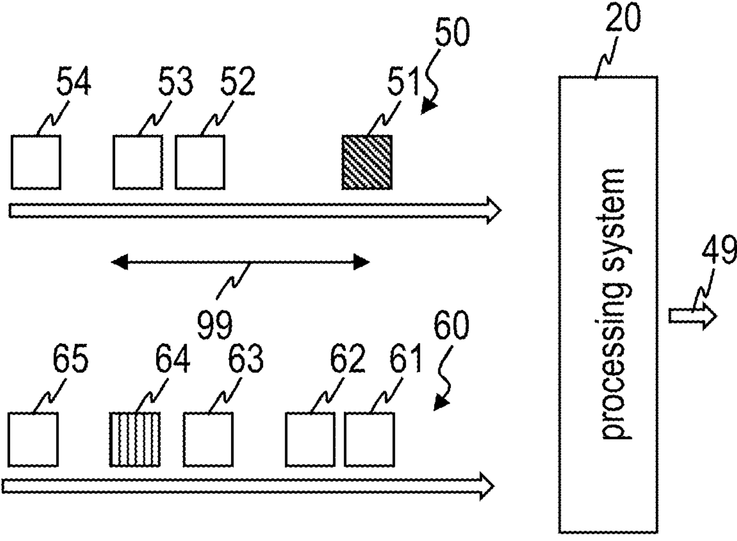
FIG. 8 is a schematic representation of a system comprising the processing system, illustrating several streams received by the processing system.

Operation of the processing system will be explained in more detail with reference to exemplary streams 50, 60 that are schematically illustrated in FIG. 8 in FIG. 9.

FIG. 8 shows streams 50, 60 received by the processing system 20. The processing system 20 is operative to perform stream processing including an integrity verification of the several streams 50, 60. Stream 50 comprises a first sequence of messages 51, 52, 53, 54. Stream 60 comprises a second sequence of messages 61, 62, 63, 64, 65. As schematically illustrated by the pattern filled, messages 51 and 64 indicate modifications of different map layers that are related to a same map object. For illustration, message 51 may include the information that a node or a way has been deleted in a base map layer. Message 64 may include the information that a map object in another map layer that references this node or way (which is deleted according to message 51) is also deleted.

In this case, the processing system 20 determines, based on message 51, that deletion of the way or node creates an integrity issue, because the processing system 20 is not yet received any indication that the map object to which message 64 relates has also been deleted. Detection of this integrity issue triggers monitoring over a time period 99. Receipt of the message 64 within the time period 99 allows the processing system 20 to determine that the integrity issue is already resolved, so that no corrective action is to be taken in this regard.

The processing system 20 may generate an output message for inclusion in an output stream of the output 49, with the output message including an aggregate of the messages 51, 64, which both relate to the map object (albeit in different manner) for which message 51 indicates deletion of the respective map object (e.g., a node or way).

Figure 9:
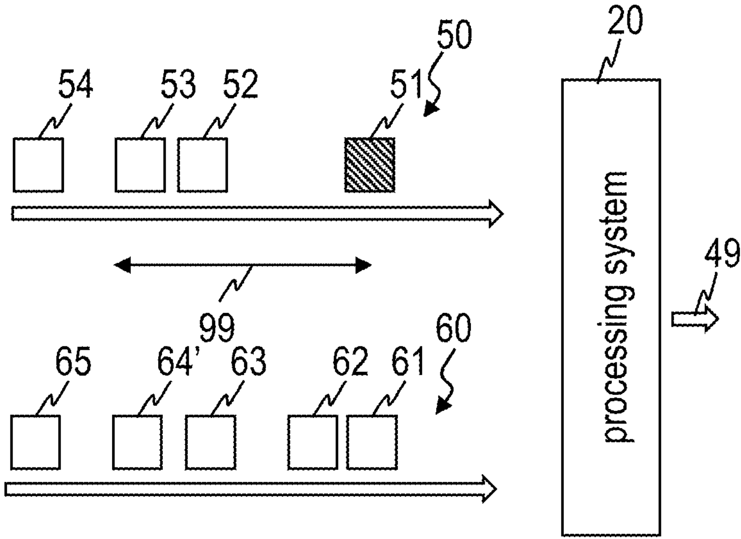
FIG. 9 is a schematic representation of a system comprising the processing system, illustrating several streams received by the processing system.

FIG. 9 shows a variant in which the stream 60 includes a second sequence of messages 61, 62, 63, 64', 65. The message 64' does not delete the map object that still references the node or way deleted according to message 51. Thus, in this case, the processing system 20 determines that the integrity issue identified by processing message 51 is not indicated to have been resolved by any of the messages received within the time period 99.

It will be appreciated that an integrity issue determined to exist based on a message 51 in a stream 50 of the several streams 50, 60 can also be determined as being resolved based on another message in the same stream 50. For illustration, if message 52 or message 53 indicates that the map object deleted according to message 51 was added again, the processing system 20 is operative to determine that messages received within the time period 99 after detection of the integrity issue resolve this integrity issue.

The processing system 20 may, thus, be operative to employ a window-based processing technique in which a time window (indicated by a time period 99 in FIG. 8 and FIG. 9) is used to monitor messages for potential resolutions of a detected integrity issue. The information from a message (such as message 51) determined to give rise to an integrity issue may be temporarily stored for ascertaining whether the integrity issue can be determined, based on messages received within the time period 99 after detection of the integrity issue, to have been resolved. Temporarily storing the information from the message (such as message 51) determined to give rise to an integrity issue is also useful for retrieving this information for generation of an output message in an output stream of output 49, in particular after ascertaining that the integrity issue can be determined, based on messages received within the time period 99 after detection of the integrity issue, to have been resolved.

Figure 10:
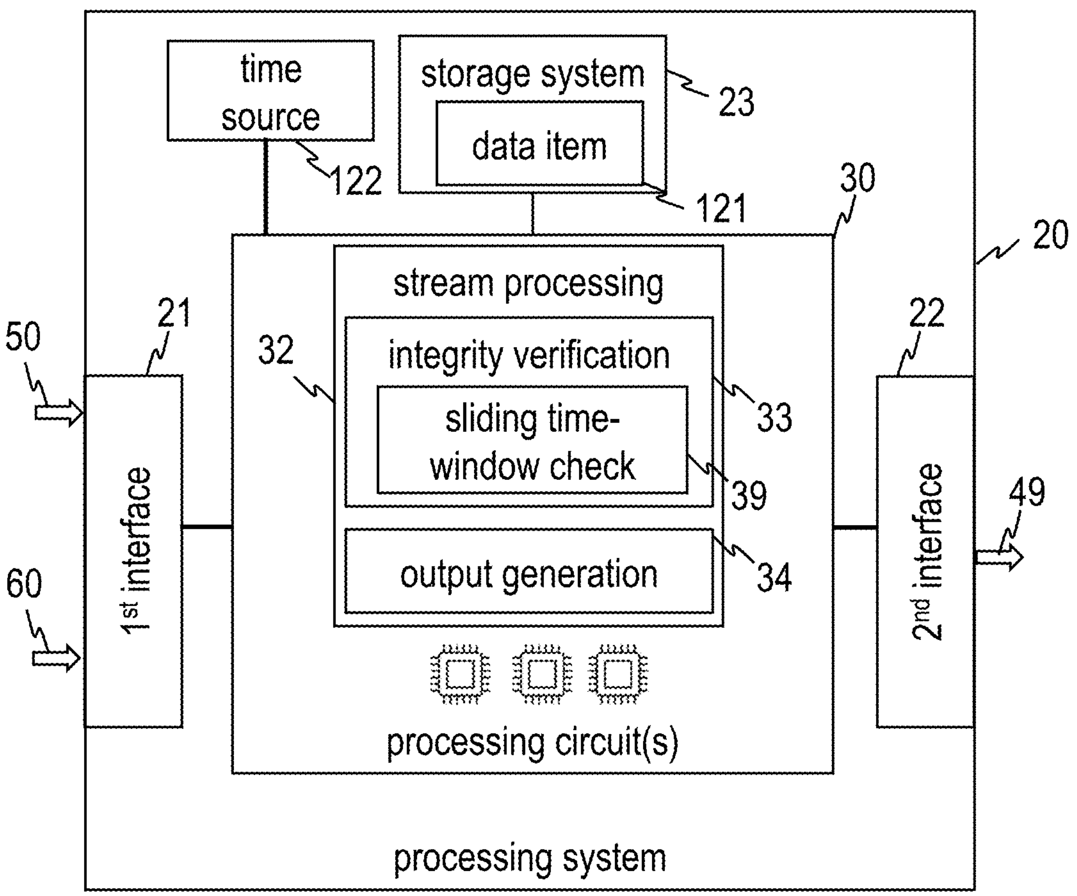
FIG. 10 is a schematic representation of a processing system operative to perform a method of modifying map data.

FIG. 10 shows a schematic representation of the processing system 20 operative to determine, responsive to detection of an integrity issue, whether messages received within a time period 99 after detection of the integrity issue show that the integrity issue has already been dealt with.

The stream processing 32 is operative to store a data item 121 in the storage system 23 responsive to detection of the integrity issue. The data item 121 includes information, such as payload data and/or other information, that is based on the message determined to be associated with the integrity issue.

By storing the data item 121 in the storage system 23, the stream processing 32 temporarily removes the respective message from the ordinary stream processing a flow, which may operate, for example, in a sequential one-by-one processing of messages as they are being received. As mentioned above, the data item 121 may be used for various purposes, such as determining whether messages received within the time period 99 after detection of the integrity issue indicate that the integrity issue has already been addressed in the map layers. Alternatively or additionally, the data item 121 may be used for generating, at a later time and after ascertaining that the integrity issue has been addressed, an output message for inclusion in an output stream of the output 49.

The stream processing 32 is operative to perform a sliding time window check 39. The sliding time window check 39 is operative to analyze, responsive to detection of an integrity issue, messages received within the time period 99 of the detection of the integrity issue with regard to whether any of the messages indicates that the integrity issue has already been resolved.

The sliding time window check 39 may use time information obtained from a time source 122 of the processing system 20 or coupled to the processing system 20. The time source 122 may also be an integral time source of the at least one processing circuit 30.

The output generated based on the integrity verification may have various forms, as will be explained with reference to FIG. 11, FIG. 12, FIG. 13, FIG. 14, and FIG. 15.

Figure 11:
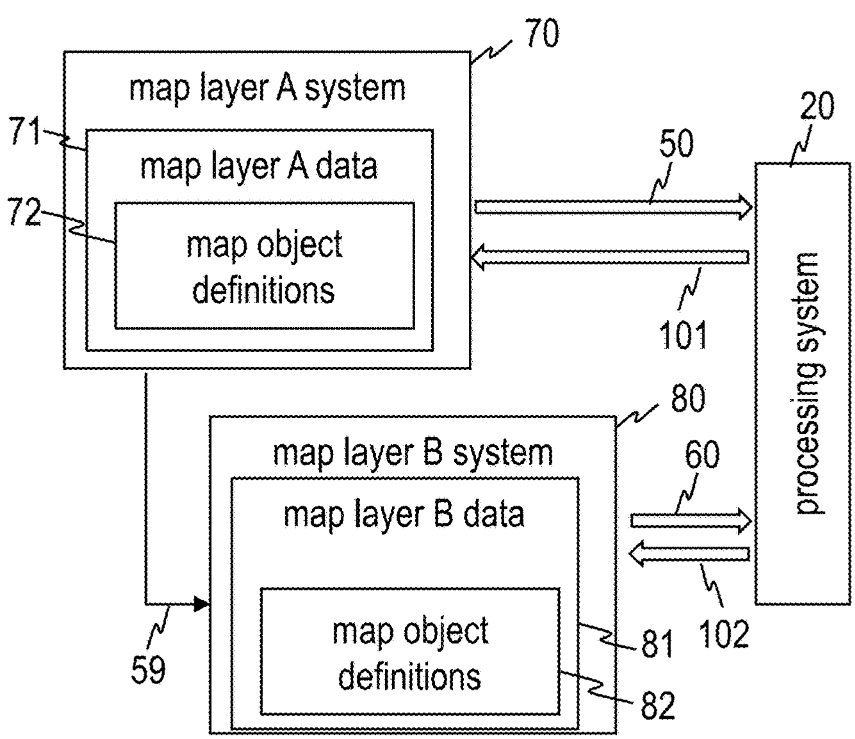
FIG. 11 is a schematic representation of a system comprising the processing system.

FIG. 11 shows a system comprising several map layer provision system 70, 80 and the processing system 20. The processing system 20 is operative to generate, based on a result of the integrity verification, output comprising feedback 101 and/or feedback 102 for provision to one or several of the map layer provision systems 70, 80. The feedback 101 and/or the feedback 102 may be provided to, responsive to detection of an integrity issue, to one or several map layer provision systems that are involved in the integrity issue. For illustration, if an integrity issue is caused by a deletion of a map object definition from the map object definitions 72 of a map layer provision system 70, with this map object being still referenced by another map object definition in the map object definitions 82 of another map layer provision system 80, the processing system 20 may be operative to generate feedback 102 for provision to the other map layer provision system 80 to indicate which of the map object definitions 82 includes a reference to a no longer existing object. Alternatively or additionally, the processing system 20 may be operative to generate feedback 10 one for provision to the map layer provision system 70 to indicate that deletion of the map object creates an integrity issue. Alternatively or additionally, if an integrity issue is caused by addition or change of a map object definition that references another object that does not exist or that there is no longer exist, the processing system 20 may be operative to provide feedback to the map layer provision system in which the additional change has been made.

Figure 12:
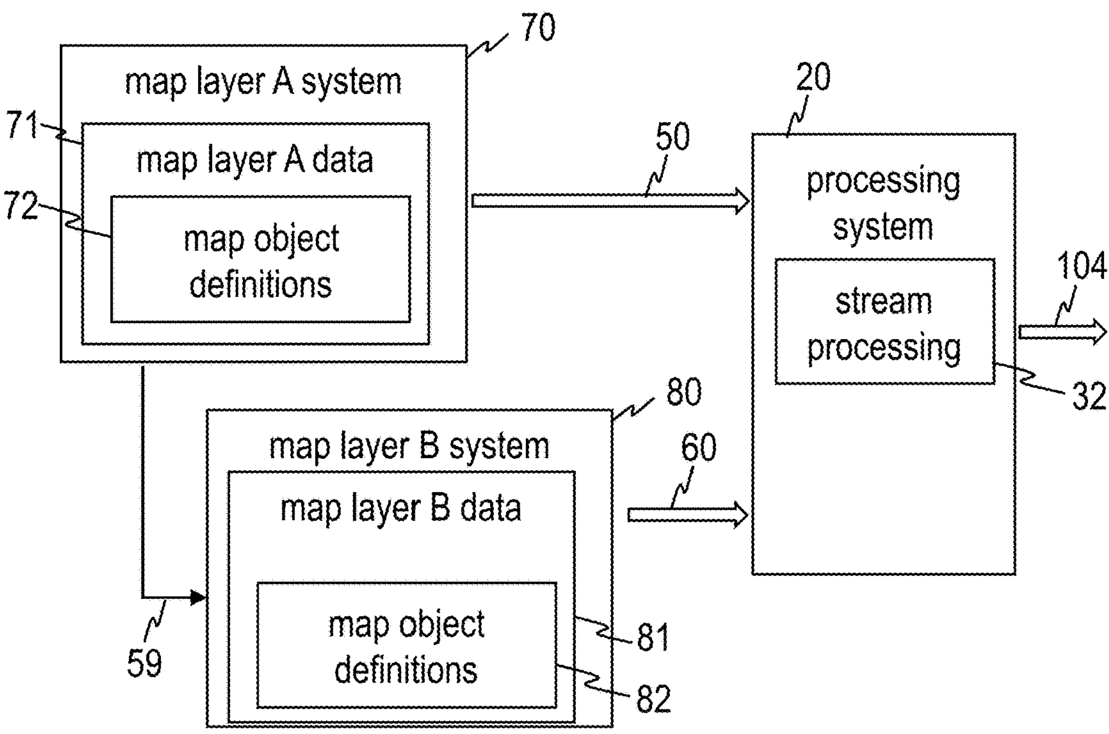
FIG. 12 is a schematic representation of a system comprising the processing system.

FIG. 12 shows a system comprising several map layer provision system 70, 80 and the processing system 20. The processing system 20 is operative to generate, based on a result of the integrity verification, output comprising an output stream 104. The output stream 104 may comprise a sequence of output messages. The output stream 104 may be provided to a map data provision system and/or a map data consumer. The sequence of output messages in the output stream 104 may comprise messages that include information aggregated from at least two different streams 50, 60 received and processed by the stream processing 32. The sequence of output messages in the output stream 104 may comprise other messages that include information taken from only one of the several streams 50, 60. The latter case may happen when a message in a stream 50 or 60 indicates a modification of a map object definition, but no other message in the received several streams relates to the same object.

By generating the output stream 104 using stream processing 32, good map data freshness can be attained as compared to, e.g., batch processing techniques.

Figure 13:
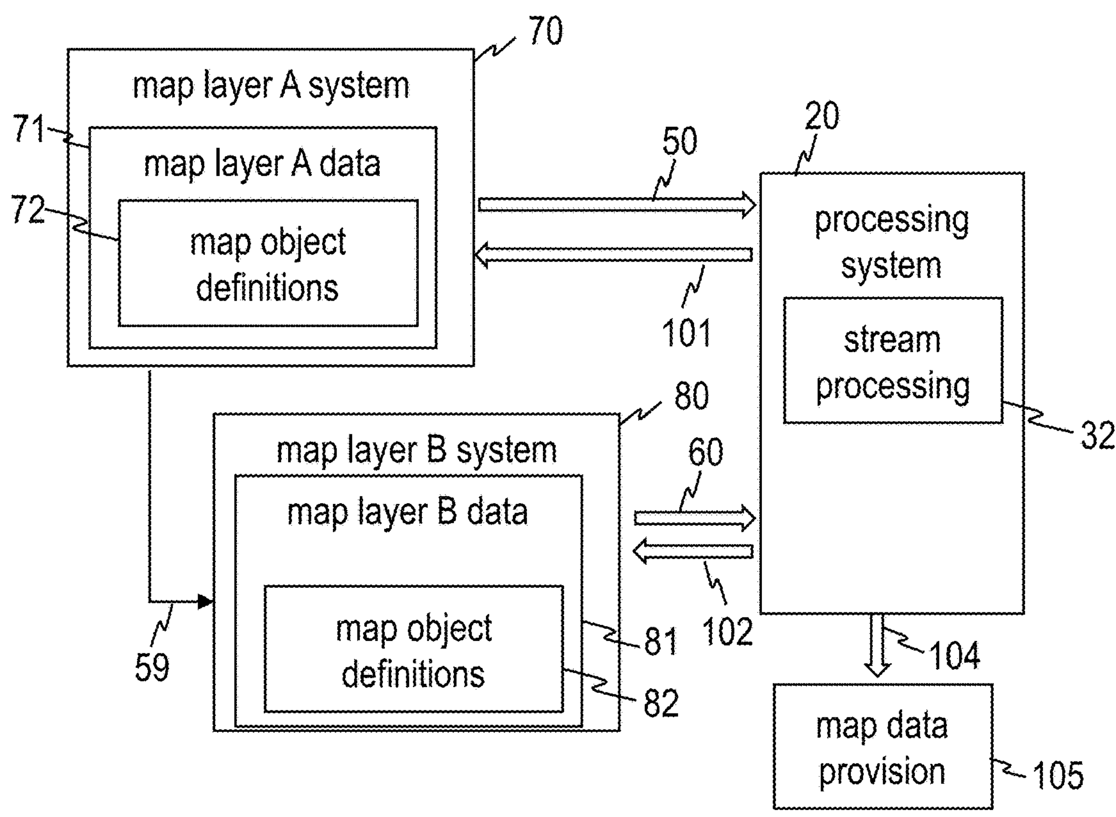
FIG. 13 is a schematic representation of a system comprising the processing system.

FIG. 13 shows a system comprising several map layer provision system 70, 80 and the processing system 20. The processing system 20 is operative to generate, based on a result of the integrity verification, output comprising an output stream 104 and feedback 101, 102 for provision to the map layer provision systems 70, 80.

The output stream 104 may be provided to a map data provision system 105, which may be communicatively interfaced with or integral with the processing system 20. The map data provision system 105 may be operative to provide map data based on the output stream 104 to one or several map data consumers, such as vehicle systems, smartphones, and/or other map data consumers for use in performing a map data-based function. The map data provision system 105 may also perform post-processing functions such as filtering, quality assurance, and/or other post-processing functions of the output stream 104.

Figure 14:
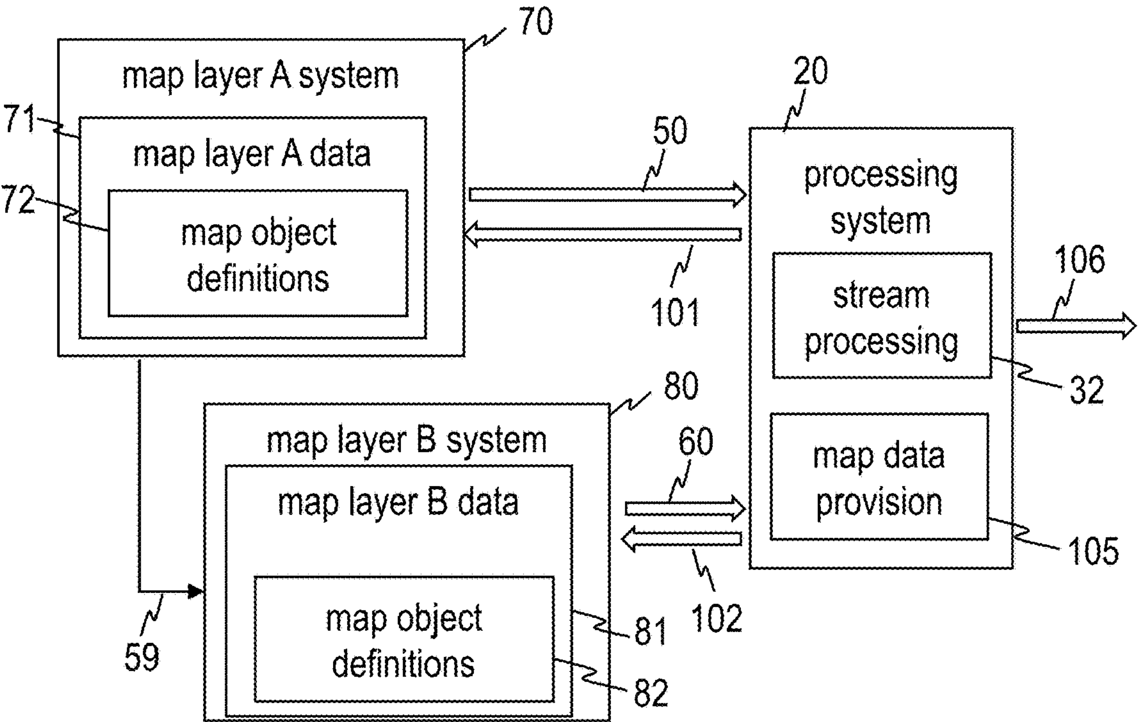
FIG. 14 is a schematic representation of a system comprising the processing system.

FIG. 14 shows a system comprising several map layer provision system 70, 80 and the processing system 20. The processing system 20 is operative to generate, based on a result of the integrity verification, output comprising feedback 101, 102 for provision to the map layer provision systems 70, 80 and an output stream 106. The output stream 106 may be generated by post-processing, by a map data provision system, an output stream of the stream processing 32. The post-processing may include functions such as filtering, quality assurance, and/or other post-processing functions of the output stream of the stream processing 32.

Figure 15:
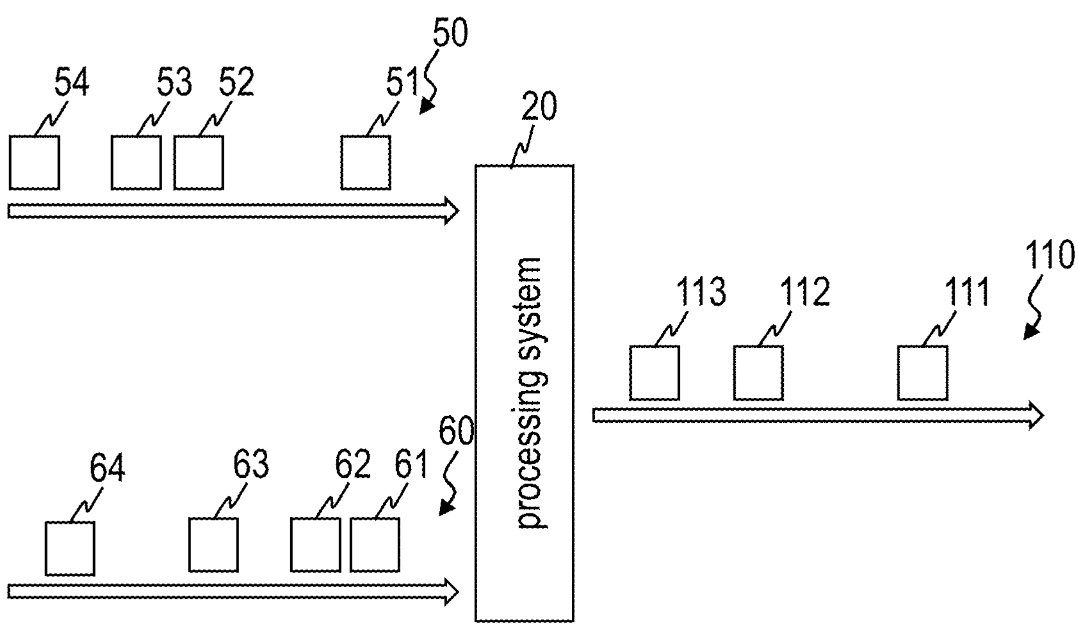
FIG. 15 is a schematic representation of a system comprising the processing system, illustrating several streams received by the processing system and an output stream provided by the processing stream.

FIG. 15 illustrates an output stream 110, which may be the output stream 104 and/or the output stream 106. The output stream 110 comprises a plurality of output messages 111, 112, 113. A relative timing of the output messages may be different from a relative timing of messages in each of the several streams 50, 60 received and processed by the processing system 20. For illustration, a time delay between successive ones of the output messages 111, 112, 130 may vary as a function of time and may be different from a time delay between successive ones of messages in each of the several streams 50, 60.

By virtue of the stream processing, the processing system 20 is operative to generate and, optionally, output an output message 111 based on at least one message of the several streams 50, 60, at a time at which successive messages of the several streams 50, 60 may not even have been received by the processing system 20.

Figure 16:
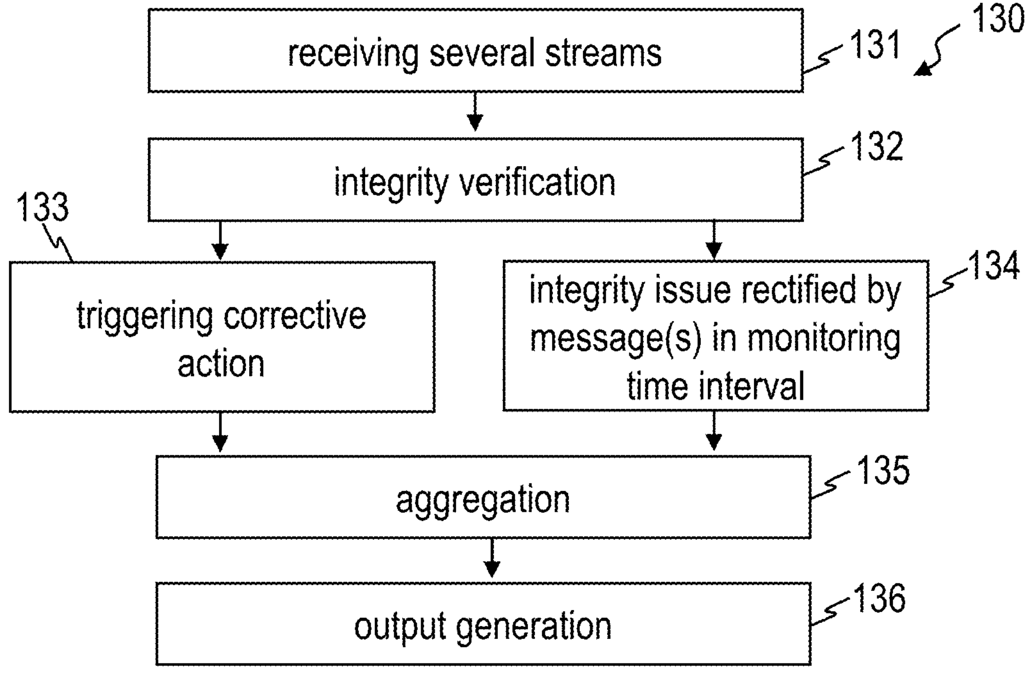
FIG. 16 is a flow chart of a method.

FIG. 16 is a flow chart of a method 130. The method 130 may be performed automatically by the processing system 20.

At process block 131, the processing system 20 receives the several streams 50, 60.

At process block 132, the processing system 20 performs an integrity verification. The integrity verification may comprise a referential integrity verification. The integrity verification may alternatively or additionally comprise a logical integrity verification and/or a syntactical integrity verification.

At process block 133, responsive to detecting an integrity issue, the processing system 20 may trigger a corrective action. Alternatively, at process block 134, and responsive to detecting an integrity issue, the processing system 20 may determine that one or several messages received in a time period 99 of the detection of the integrity issue indicate that the integrity issue has already been addressed by additional modifications in the map layers. Process block 133 may also be omitted. When present, process block 133 is useful to reduce the rate of occurrence of referential integrity issues.

At process block 135, the processing system 20 may aggregate information from different messages included in the several streams 50, 60 to generate at least some output messages of the output stream of the stream processing. Information from messages included in the several streams 50, 60 may be aggregated when they relate to a same map object, e.g., when one of the messages defines a modification of the map object definition of the map object itself and a different one of the messages relates to a further map object that references this map object.

At process block 136, the output is generated. The output may comprise at least some of output messages that include information aggregated from several messages included in the several streams.

Figure 17:
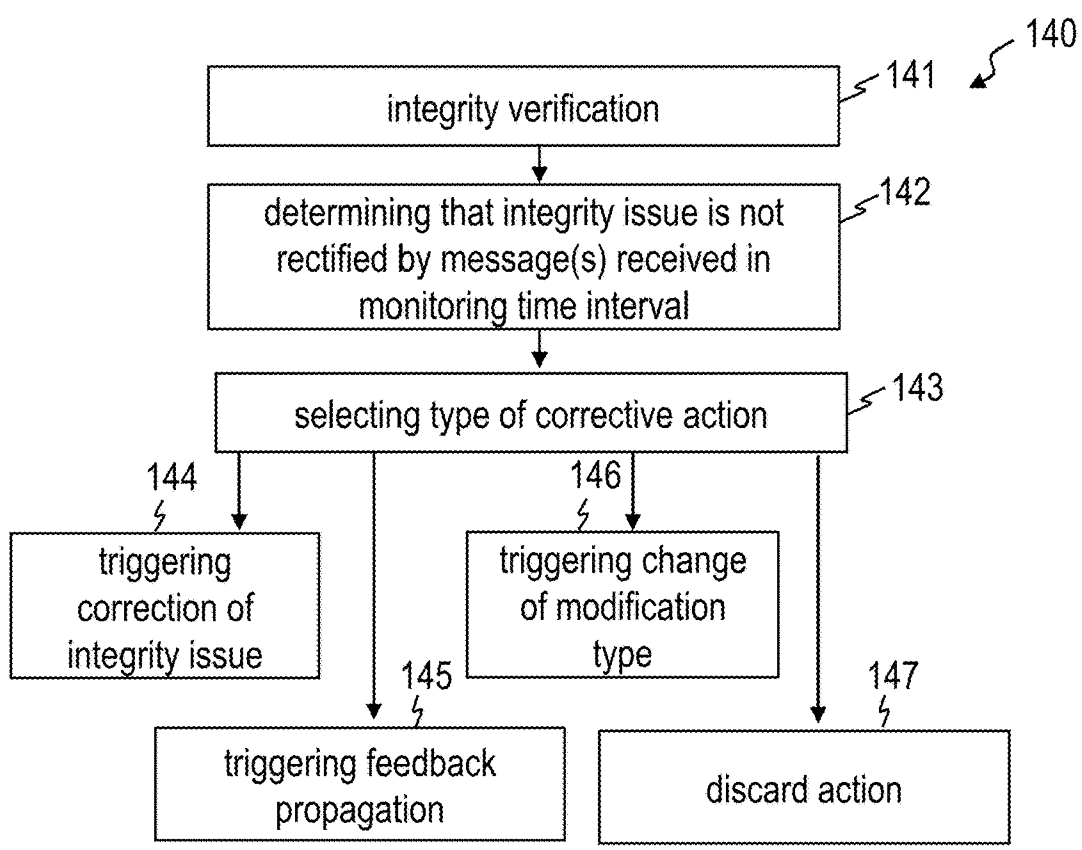
FIG. 17 is a flow chart of a method.

FIG. 17 is a flow chart of a method 140. The method 140 may be performed automatically by the processing system 20.

At processing block 141, the processing system 20 performs the integrity verification. Processing block 141 may be implemented as previously described.

At process block 142, the processing system 20 determines that messages received within a time interval 99 of the detection of an integrity issue do not allow the processing system 20 to ascertain that the integrity issue is already been resolved in the map layers.

At process block 143, the processing system 20 may optionally select a type of corrective action to be performed. The selection of the type of corrective action may depend on the type of integrity issue identified in the integrity verification at process block 141. For illustration, the type of corrective action may depend on whether the integrity issue is a referential integrity issue, or another type of integrity issue.

Depending on the type of corrective action selected at process block 143, the processing system 20 may be operative to trigger, at process block 144, a correction of the integrity issue. Triggering the correction of the integrity issue may comprise triggering correction of a map object definition that references another map object that is no longer existent.

Alternatively or additionally, the processing system 20 may be operative to trigger, at process block 145, a provision of feedback to one or several map layer provision systems involved in the detected integrity issue. The provision of feedback may be performed so as to allow the one or several map layer provision systems to correct, potentially using communication over the at least one communication link 59 between map layer provision systems, the integrity issue.

Alternatively or additionally, the processing system 20 may be operative to trigger, at process block 146, a change of a modification type that has led to the detected integrity issue. For illustration, if the processing system 20 determines, based on a message included in the several streams, that a modification of map layer data includes creation of a duplicate of an already existing map object, the processing system 20 may cause the map layer provision system to change the modification from a creation to a change of the already existing map object.

Alternatively or additionally, the processing system 20 may be operative to perform, at process block 147, a discard operation. For illustration, if the processing system 20 determines, based on a message included in the several streams, that there is a duplicate of an object creation, a duplicate of an object deletion, or an update of a non-existing object, this processing system 20 may discard this.

Figure 18:
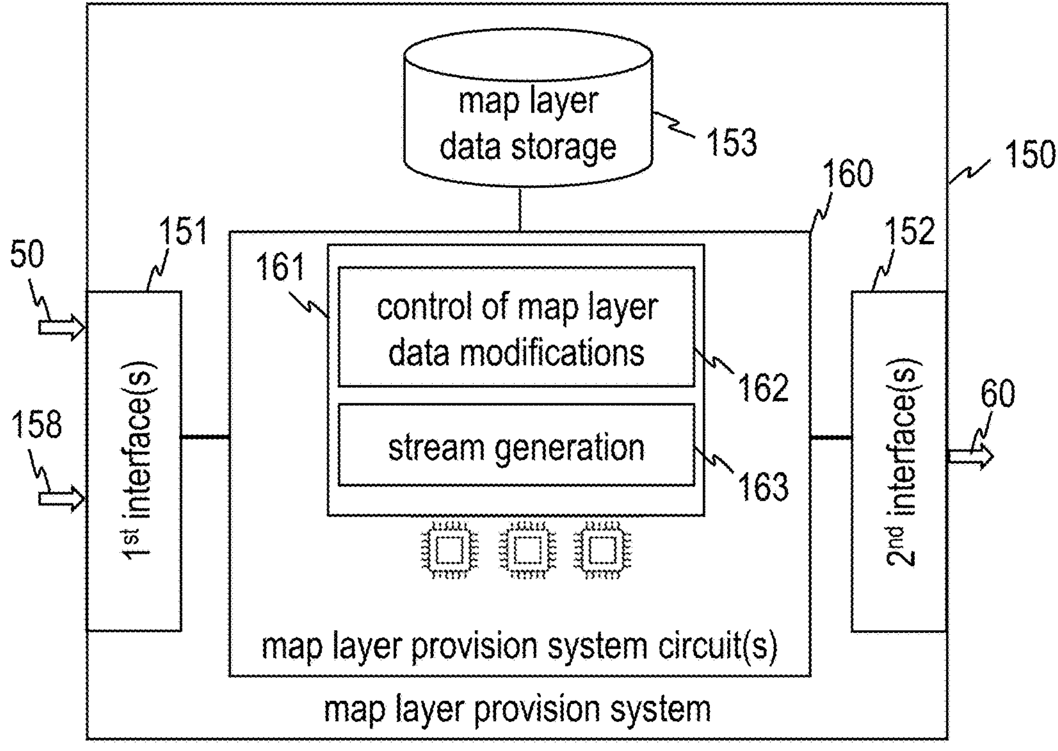
FIG. 18 is a schematic representation of a map layer provision system.

FIG. 18 is a schematic representation of a map layer provision system 150 operative to provide a stream 60 comprising a sequence of messages, each associated with a modification of a map object definition in a map layer with which the map layer provision system 150 is associated.

The map layer provision system 150 comprises or is coupled to a map layer storage 153. The map layer storage 153 has stored therein map layer data comprising map object definitions for at least one map layer.

The map layer provision system 150 comprises at least one interface 151, 152. The map layer provision system 150 is operative to receive, via the at least one interface 151, 152, a stream 50 generated by another map layer provision system and/or other data 158 such as version data.

The map layer provision system 150 comprises at least one map layer provision system circuit 160 operative to perform map layer related functions 161. The at least one map layer provision system circuit 160 may comprise any one or any combination of integrated circuits, integrated semiconductor circuits, processors, controllers, application specific integrated circuits (ASICs), field programmable gate arrays (FPGAs), circuit(s) including quantum bits (qubits) and/or quantum gates, without being limited thereto.

The map layer provision system circuit 160 may be operative to perform a control 162 of map layer data modifications. The map layer provision system circuit 160 may be operative to retrieve data from the map layer data storage 153 and/or write into the map layer data storage 153 to at least one of: add a new map object definition, change an existing map object definition, delete an existing map object definition. The control 162 may be operative to perform the map layer data modification based on new observations as they become available (e.g., based on observations of road blockages observed from vehicle location traces and/or based on observations of new restrictions collected using vehicular sensor systems). Previous versions of the map layer data may be retained in the process, causing several versioned variants of the map layer data to be stored in the map layer data storage 153.

The control 162 may also be operative to perform the map layer data modification responsive to messages included in a stream 50 received from another map layer provision system, which other map layer provision system defines map objects referenced by map layer object definitions in the map layer data storage 153. In the latter case, while the modification of the map layer object definition in the map layer data storage 153 is initiated by receipt of a message from another map layer provision system, it is not required for the map layer provision system 150 and the other map layer provision system (such as map layer provision system associated with a child or parent layer of the map layer handled by the map layer provision system 150) to align a timing at which the modifications are respectively made.

The map layer provision system circuit 160 is also operative to perform a stream generation 163. The stream generation 163 may be operative such that, responsive to a modification of a map object definition in the map layer data storage 153, the map layer provision system 150 generates a message of a stream 60 output by the map layer provision system 150 for provision to the processing system 20 (and, optionally, other map layer provision system(s)).

The stream generation 163 is operative such that a message of the stream 60 may be generated and output, as part of the stream 60, at a timing that is not synchronized with a timing at which messages in, e.g., the stream 50 are received by the map layer provision system 150. The stream generation 163 may be operative such that a time delay between successive messages of the stream 60 may be variable. This allows new messages to be output in the stream 60 with a timing that reflects the timing at which modifications are made to the map object definitions in the map layer data storage 153.

The map layer provision system 150 may be operative to receive and process feedback from the processing system 20, such as feedback 101 or feedback 102

Figure 19:
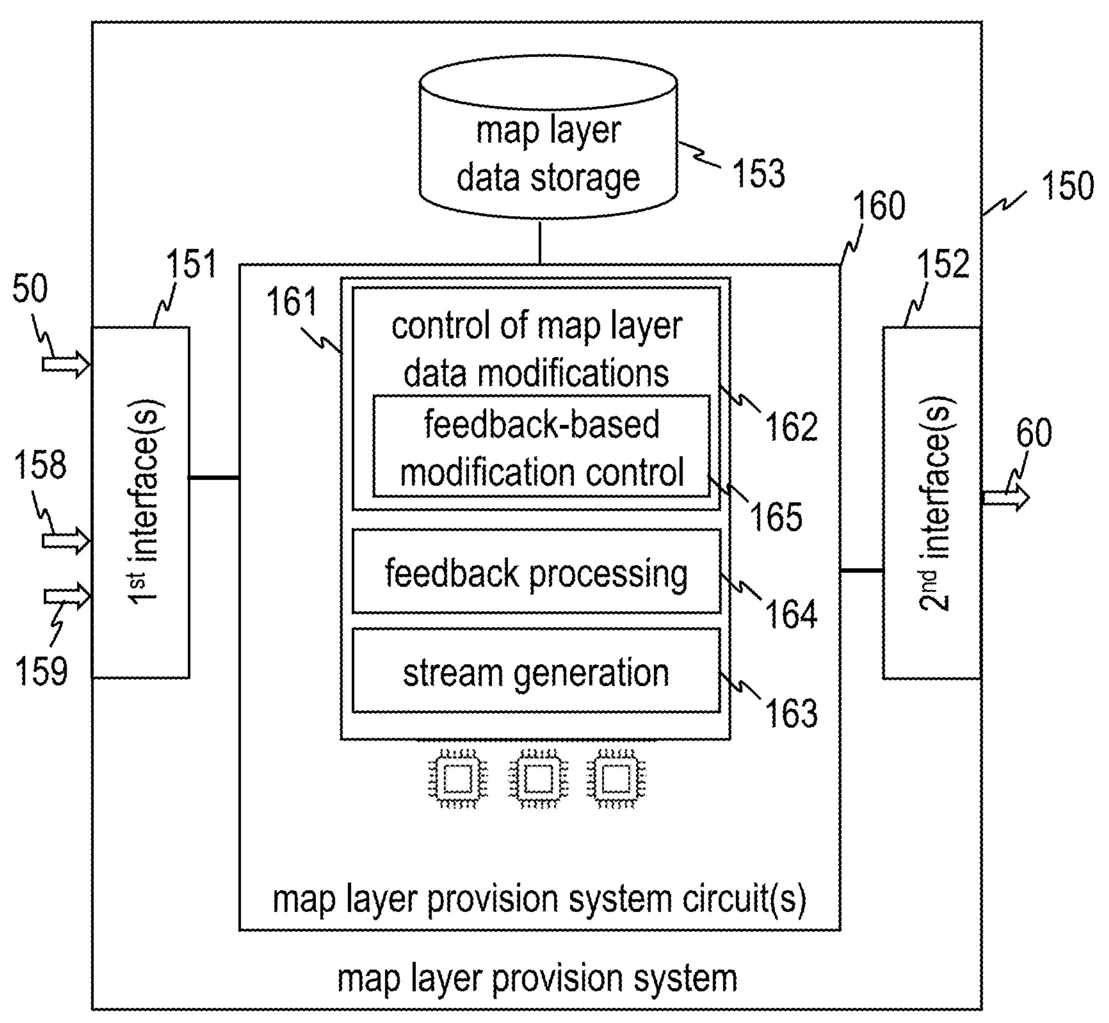
FIG. 19 is a schematic representation of a map layer provision system.

FIG. 19 is a schematic representation of the map layer provision system 150. The at least one interface 151, 152 is operative to receive feedback 159 from the processing system 20. The control 162 comprises a fleet bag based modification controller 165, which modifies map object definitions in the map layer data storage one hundred 53 responsive to the feedback received from the processing system 20. The at least one map layer system processing circuit or hundred 60 is operative to perform a feedback processing 164 to determine, based on the received feedback and, optionally, based on the stream 50, which modifications are to be made to the map object definitions in the map layer data storage one hundred 53 to resolve a reported integrity issue.

The modification, also when performed in a feedback-initiated manner, causes a message to be generated and output in the stream 60, thereby allowing the processing system 20 to determine that a detected integrity issue is been resolved.

Figure 20:
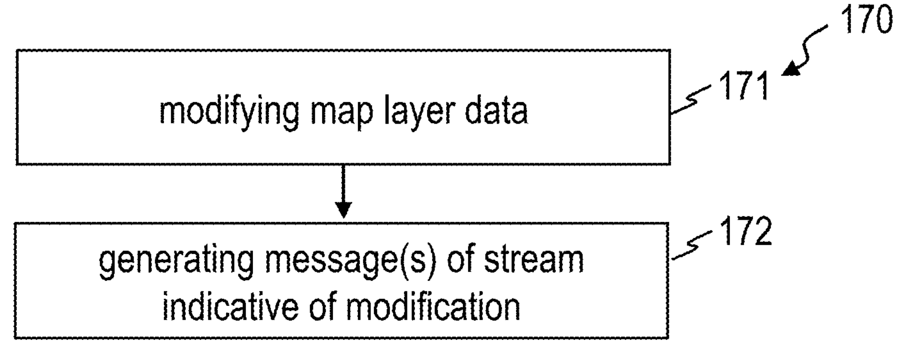
FIG. 20 is a flow chart of a method.

FIG. 20 is a flow chart of a method 170. The method 170 may be performed automatically by the map layer provision system 150.

At process block 171, the map layer provision system 150 modifies at least one map object definition in the map layer data storage. The modification may comprise an addition of a new map object definition, a change of an existing map object definition, a deletion of an existing map object definition. The modification may be based on new information (e.g., new observations acquired using sensors of vehicles) related to the respective map layer. The modification may be caused to be made responsive to a message in a stream received from another map layer, such as a parent layer that defines map objects referenced by map object definitions in the map layer handled by the map layer provision system 150.

At process block 172, the map layer provision system 150 generates a message of the stream 60 which is indicative of the modification made. The message may also include version information.

The generation of messages of the stream 60 at process block 172 may be performed such that a message of the stream 60 may be generated and output, as part of the stream 60, with a timing that is not synchronized with a timing at which messages in, e.g., the stream 50 are received by the map layer provision system 150. The generation of messages of the stream 60 may be performed such that a time delay between successive messages of the stream 60 may be variable. This allows new messages to be output in the stream 60 with a timing that reflects the timing at which modifications are made to the map object definitions in the map layer data storage 153.

Figure 21:
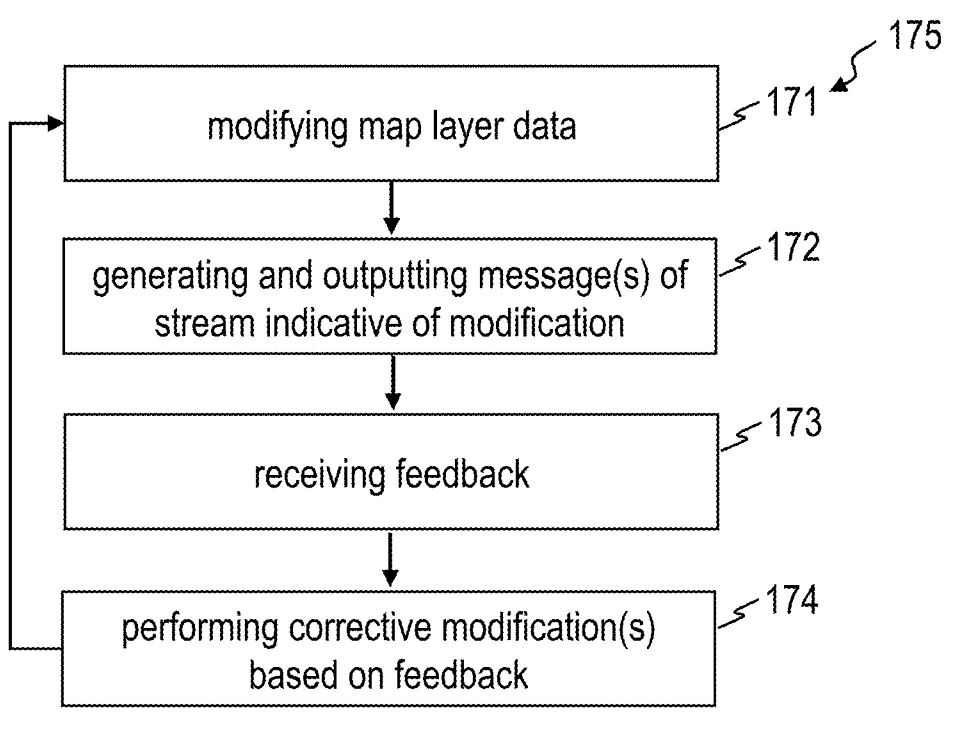
FIG. 21 is a flow chart of a method.

FIG. 21 is a flow chart of a method 175. The method 175 may be performed automatically by the map layer provision system 150. Process blocks 171, 172 may be implemented as described with reference to FIG. 20.

At process block 173, the map layer provision system 150 receives feedback from the processing system 20. The feedback may be indicative of an integrity issue identified by the integrity verification by the processing system 20.

At process block 174, the map layer provision system 150 performs a corrective modification based on the feedback. The corrective modification of at least one map object definition is performed in such a way that the integrity issue identified by the integrity verification of the processing system 20 and indicated in the received feedback is rectified. The map layer provision system 150 generates and outputs a message in the stream 60 also for the corrective modification.

As previously mentioned, modifications in map layer data by way of adding, changing, or deleting map object definitions, may be performed so as to improve agreement between the map layer and the physical world reality in which the map data is used for performing map-based functions.

Figure 22:
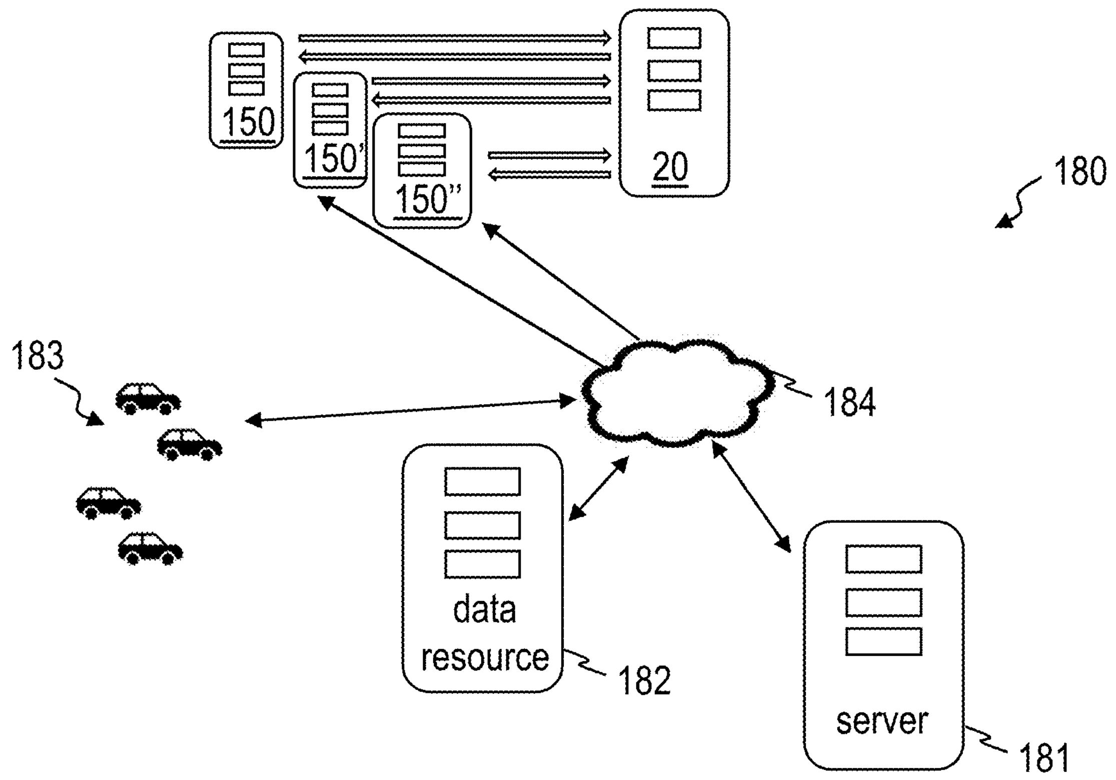
FIG. 22 is a schematic representation of a system comprising the processing system and several map layer provision systems.

FIG. 22 is a schematic representation of a system 180 which comprises the processing system 20 and several map layer provision systems 150, 150', 150". Each of the several map layer provision systems may be operative as disclosed in association with FIG. 18 and FIG. 19.

The several map layer provision systems 150, 150', 150" may be operative to respectively modify map object definitions in the respective map layer responsive to information that may be captured using sensors of several vehicles 183 communicatively coupled to at least one of the map layer provisions systems 150, 150', 150" via communication links which may be provided by a communication network 184 (which may include a wide area network and/or a cellular network). For illustration, restrictions (such as blocked passages) may be identified by a map layer provision system for a restrictions layer, based on probe traces of vehicles 183, and may be used to update the restriction for the respective way.

Alternatively or additionally, at least some of the several map layer provision systems 150, 150', 150" may be operative to respectively modify map object definitions in the respective map layer based on data obtainable from data resources 182 and/or servers 181 with which the map layer provision systems are coupled via communication links provided by the communication network 184.

The various map layers may include, without limitation, a base map layer; a turn restrictions layer; a speed limits layer; a speed profile layer; a one way layer; a blocked passages layer; a buildings layer; an address points layer; a points of interest layer; a parking information layer; a point of interest layer.

Figure 23:
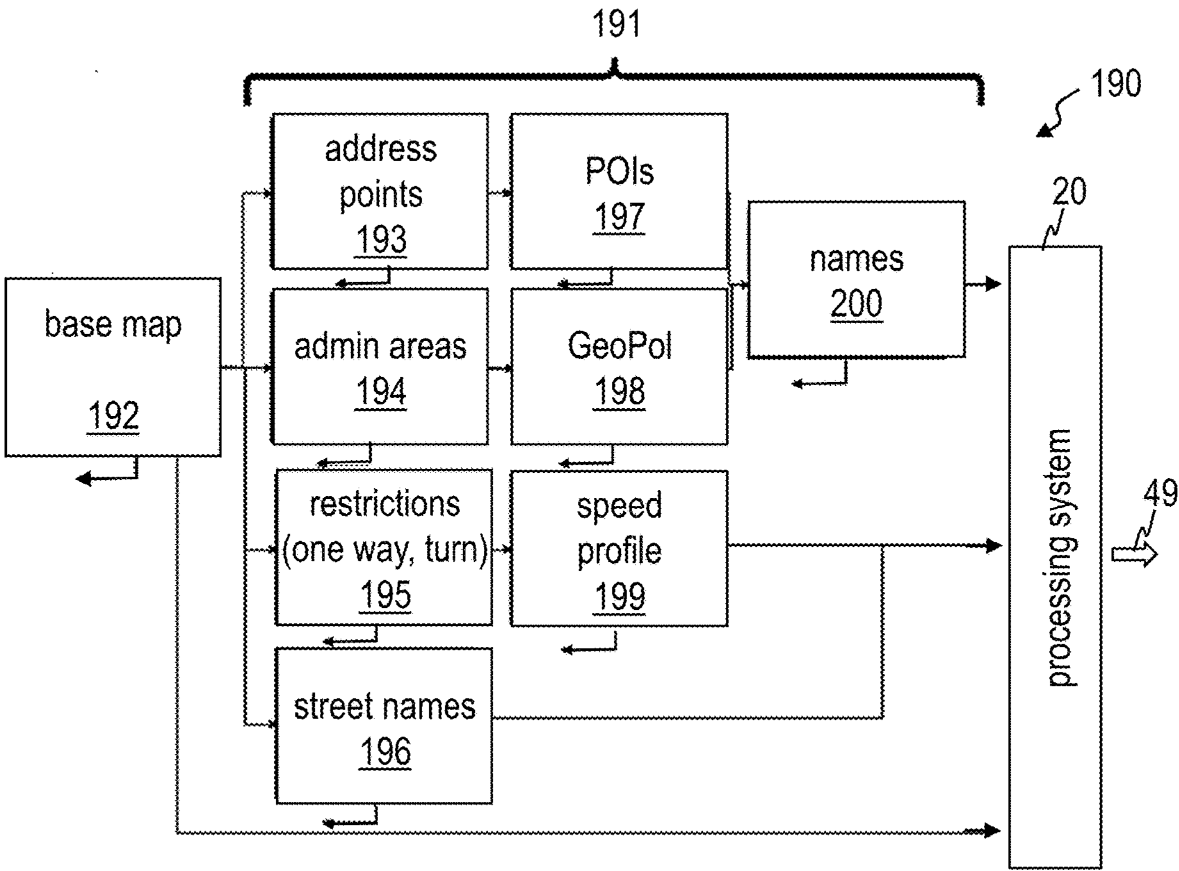
FIG. 23 is a schematic representation of an acyclic graph of several map layers that provide several streams processed by the processing system.

FIG. 23 shows an acyclic graph of map layers 190. The acyclic graph may, but does not need to have a hierarchical structure. The acyclic graph of map layers may comprise a base map layer 192 including map object definitions for nodes and ways. The acyclic graph of map layers may comprise additional map layers 191 such as an address point layer 193, which is a child layer of the base map layer 192 and which may be a parent layer of a points of interest layer 197. The acyclic graph of map layers may comprise the points of interest layer 197, which may be a child layer of the address points layer 193 and a second generation child layer of the base map layer 192. The acyclic graph of map layers may comprise an administrative areas layer 194 which may be a child layer of the base map layer 192 and which may be a parent layer of a geopolitical layer 198. The acyclic graph of map layers may comprise the geopolitical layer 198, which may be a child layer of the administrative areas layer 194 and a second generation child layer of the base map layer 192. The acyclic graph 190 may comprise additional layers such as one or several restriction layers 195 (such as layer(s) for speed restrictions, turning restrictions, blocked passages), a speed profile layer 199, a street names layer 196, and a names layer 200. Map layer provision systems for the various layers provide several streams indicative of modifications made to the respective layers. The streams are processed by the processing system 20 using stream processing to generate output 49 comprising an output stream. The streams may also be processed by the other map layer provision systems.

With reference to FIG. 24, FIG. 25, FIG. 26, FIG. 27, FIG. 28, and FIG. 29, the operation of the map layer provision systems and/or the processing system 20 will be illustrated further.

As previously noted, the processing system 20 may be operative to generate an output stream 110 which includes at least some output messages that each aggregate information from several messages of the several streams received by the processing system 20.

Figure 24:
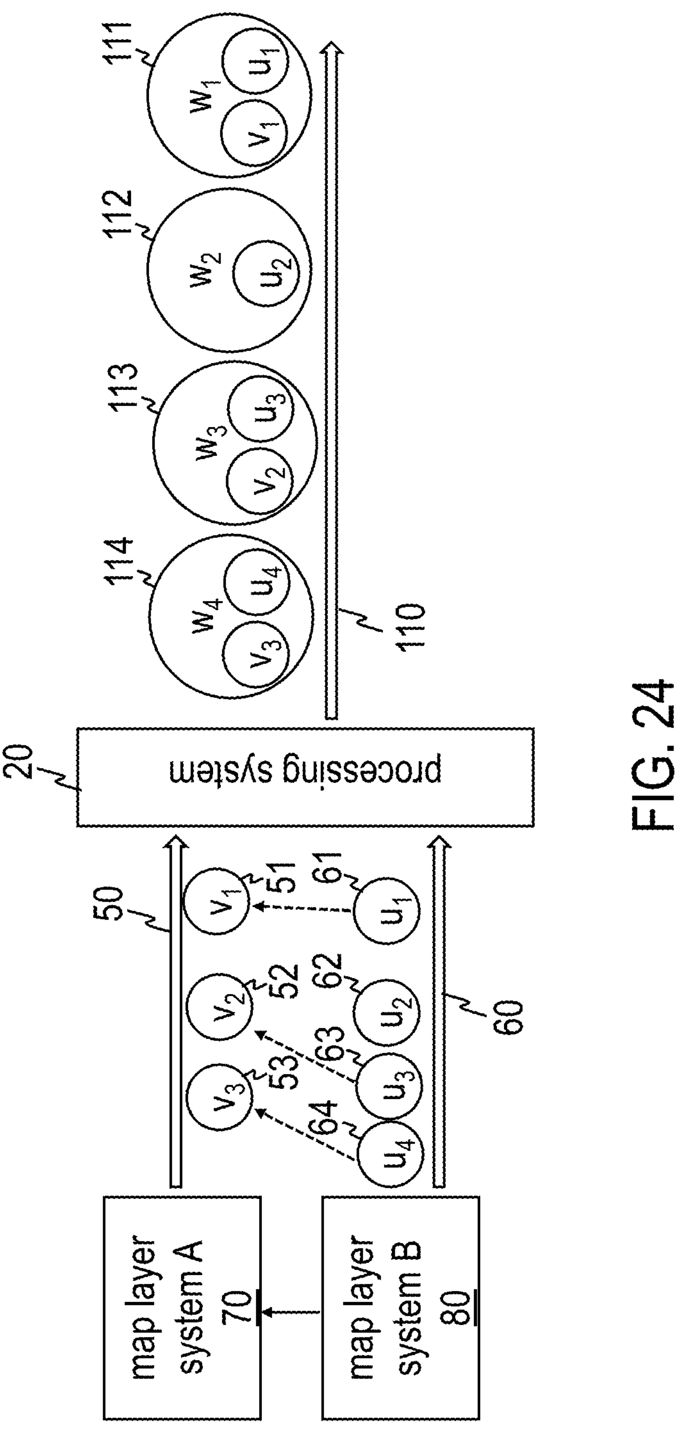
FIG. 24 is a schematic representation illustrative of operation of the processing system.

FIG. 24 illustrates a stream 50 including messages 51, 52, 53 defining various modifications of map layer object definitions in a map layer A. Stream 60 includes messages 61, 62, 63, 64 defining various other modifications of other map layer object definitions in a map layer B. As schematically illustrated by the broken connecting lines, message 61 relates to a modification of a map object definition that references a map object modified in a manner defined by message 51. Message 63 relates to a modification of a map object definition that references a map object modified in a manner defined by message 52. Message 64 relates to a modification of a map object definition that references a map object modified in a manner defined by message 53. Message 62 relates to a modification of a map object definition that does not reference any map object to which messages in the stream 50 relate.

The processing system 20 is operative to generate output messages 111, 112, 113, 114. Output message 111 aggregates information from messages 51, 61. Output message 112 includes information from message 62 (without any aggregation). Output message 113 aggregates information from messages 62, 63. Output message 114 aggregates information from messages 53, 64.

Thus, the processing system 20 is operative to perform a stream processing in which messages from the several streams are aggregated into an output message if one of the messages relates to a map object referenced by a map object definition modified as indicated by another one of the messages. If there is no related message, no aggregation need be performed.

If the integrity verification performed in the stream processing detects an integrity issue, the generation of an output message may be delayed until it can be ascertained that the integrity issue has been addressed. Thus, the order of output messages in the output stream 110 may be different from the order at which the information elements used for generating the output messages are received by the processing system 20.

Figure 25:
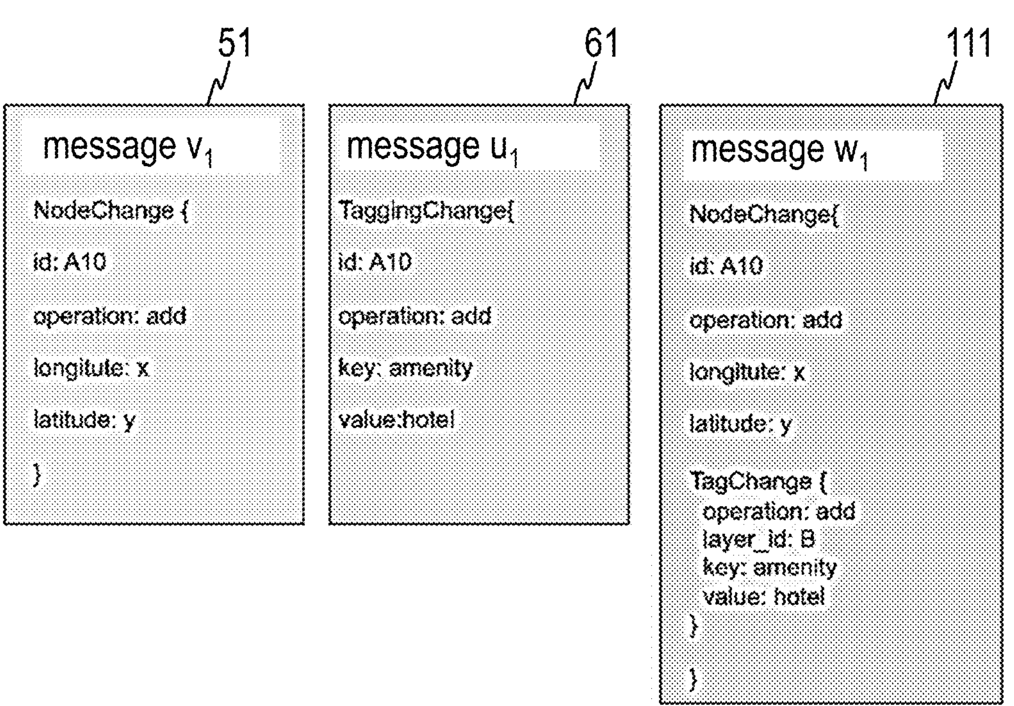
FIG. 25 shows exemplary messages of streams.

FIG. 25 shows a specific example of messages 51, 61, 111. Message 51 defines addition of a node at coordinates x and y in a map layer (such as a base map layer). Message 61 adds, in a different map layer (such as a points of interest layer) a map object definition of a hotel at the respective node. The processing system 20 is operative to generate an output message 111, in the output stream 110, which aggregates the identifier for the node, its coordinates (as specified by the base map layer message 51) and its POI information (as specified by the POI layer).

Integrity issues, such as a referential integrity issues and/or logical or syntactical integrity issues, can be identified by the processing system 20. Various examples are provided with reference to FIG. 26, FIG. 27, FIG. 28, and FIG. 29.

Figure 26:
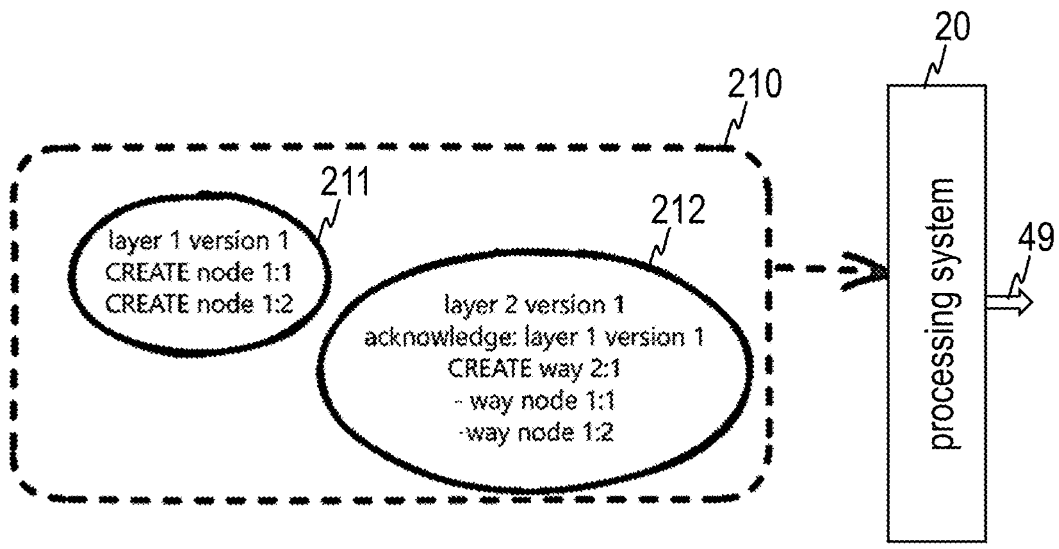
FIG. 26 is a schematic representation illustrating operation of the processing system.

FIG. 26 illustrates modifications 210 and including a modification 211 performed in a map layer and another modification 212 performed in another map layer. Modification 211 creates two new nodes referred to as “1:1” and “1:2”. The other modification 212 created, in the other map layer, a way that includes the nodes “1:1” and “1:2” as nodes of the way. The processing system 20 determines that there is no referential integrity issue. The processing system 20 generates an output message of an output stream of the output 49, which output message can aggregate the information on the modifications 211, 212.

Figure 27:
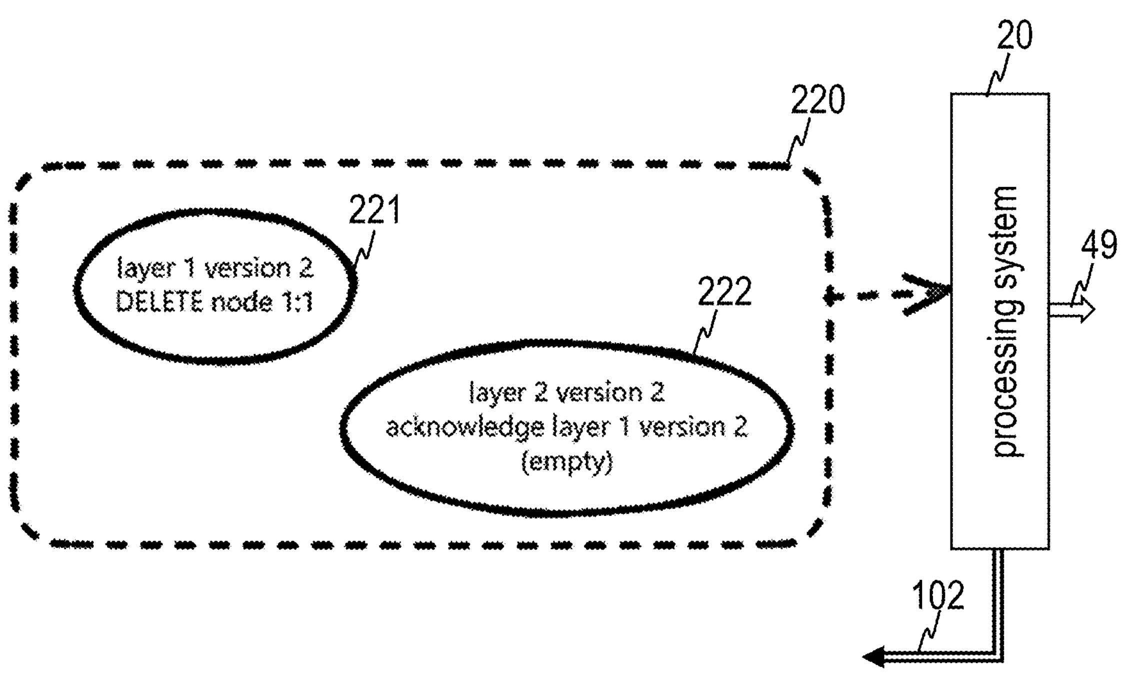
FIG. 27 is a schematic representation illustrating operation of the processing system.

FIG. 27 represents a continuation from this state and illustrates modifications 220 in which node 1:1 (created at modification 211) is deleted by modification 221. The other map layer provides an acknowledgment 222. The processing system 20 determines that there is an inconsistency because the way previously created by modification 212 now includes a reference to a no longer existing node. Responsive to detection of this integrity issue, based on the received several streams, the processing system 20 generates feedback 102 to trigger a corrective action. At this stage, no new output message of the output stream in output 49 is generated to include the deletion defined by modification 221, due to the existing referential integrity issue.

Figure 28:
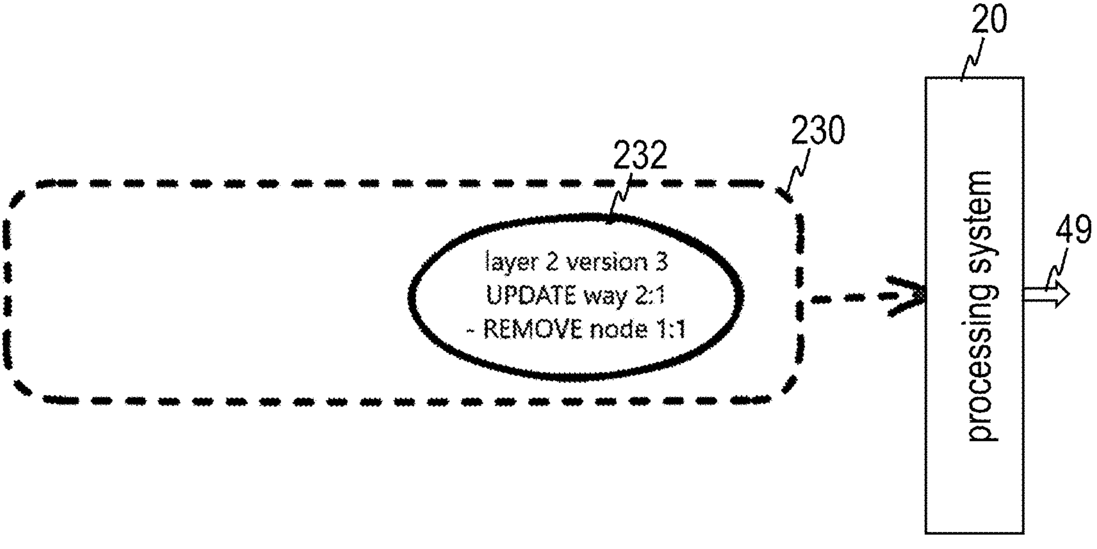
FIG. 28 is a schematic representation illustrating operation of the processing system.

FIG. 28 represents a continuation from this state and illustrates modifications 230 in which the map object definition of the way “2:1” (created at modification 212) is changed by a modification 232 removing node 1:1 therefrom. The change triggers generation of a message in a stream to the processing system 20. The processing system 20 determines that the referential integrity issue is resolved. The processing system 20 generates a new output message of the output stream in output 49 to reflect the change in the definition of way “2:1” (defined by modification 232) and the deletion of node “1:1” (defined by modification 221).

Figure 29:
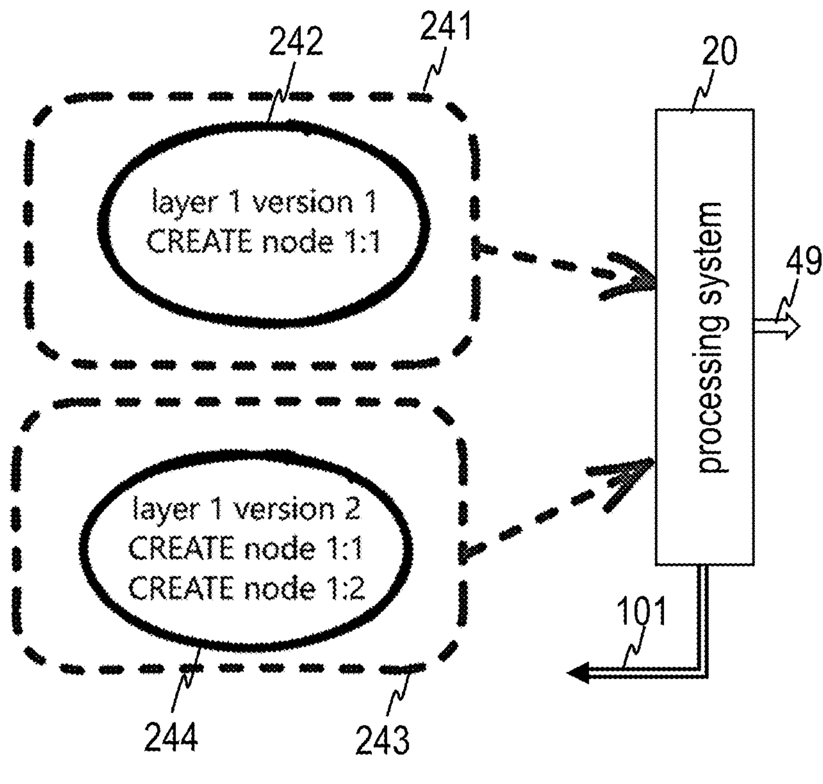
FIG. 29 is a schematic representation illustrating operation of the processing system.

FIG. 29 represents a further example in which, a “version 1” of a map layer (such as a base map layer) includes modifications 241 including a modification 242 that creates a node “1:1”. A “version 2” of the map layer includes modifications 243 including a modification 244 that creates the already existing node “1:1” and that creates a different node “1:2”. The stream provided by the respective map layer system to the processing system 20 is processed, using stream processing, by the processing system 20. The processing system 20 detects the creation, by modification 244, of a map object definition of an already existing map object. This causes the processing system 20 to provide feedback 101 to trigger a corrective action.

As already explained with reference to FIG. 10, the processing system 20 may be operative to alter the processing of received messages selectively based on a result of the integrity verification.

Figures 30, 31:
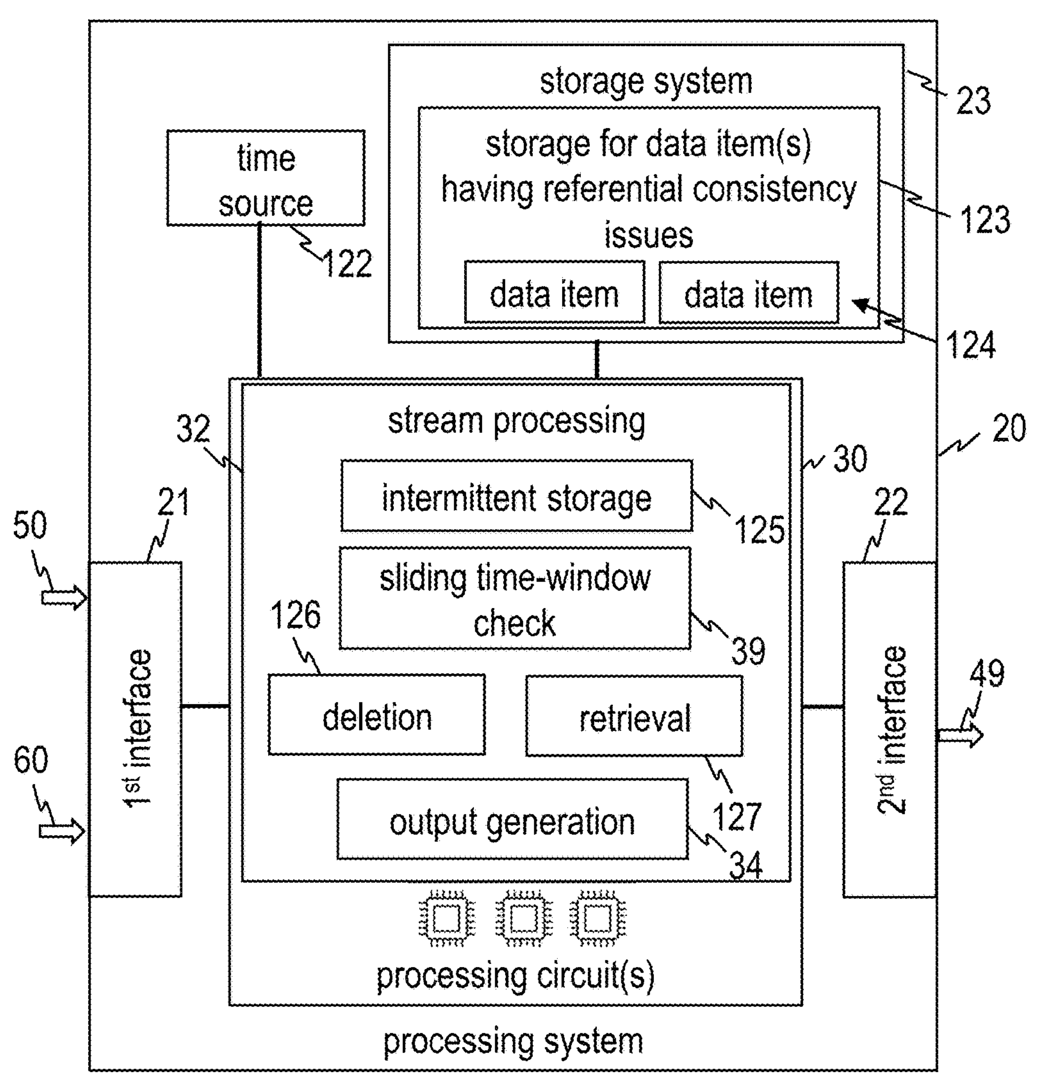
FIG. 30 is a schematic representation of a processing system operative to perform a method of modifying map data.
FIG. 31 is a schematic representation of a system comprising the processing system.

FIG. 30 shows a schematic representation of the processing system 20 to further explain this operation. The storage system 23 is operative to store, in a storage 123 for data item(s) having referential and/or other integrity issues, one or several data items 124. Each of the data items 124 includes information from a message determined to reflect a modification in a map layer which causes a referential integrity issue, and/or possibly a syntactical and/or logical integrity issue. Referring to FIG. 25, the data items may include, for example, the payload of the message determined to reflect a modification which causes the integrity issue.

As new messages of the several streams 50, 60 are received, the stream processing 32 is operative to perform a retrieval 127 of the data items 124 to check whether the integrity issue has been resolved and, if so, to use the data item that no longer has the integrity issue for generating an output message of an output stream of the output 49.

The processing system 20 may be operative such that the stream processing 32 also comprises a deletion 126 of data items 124 from the storage 123. The deletion 126 may be performed once it is ascertained that the integrity issue no longer exists. The deletion 126 may also be performed based on a time-based deletion criterion. For illustration, a time at which a data item 124 is stored may be recorded and used to select data items 124 for deletion, based on whether a threshold storage time has been reached or exceeded.

With reference to FIG. 31, FIG. 32, FIG. 33, FIG. 34, in FIG. 35, systems 250 that comprises the processing system 250 and one or several map layer provision systems 251 operative to modify map layer data 252 for one or several map layers will be described.

The one or several map layer provision systems 251 are operative to output a plurality of streams 259. The processing system 20 is operative to receive the plurality of streams 259 and to perform the stream processing 32, which comprises the integrity verification. The processing system 20 may also be operative to perform additional downstream processing operations on an output 160 one of the stream processing 32. For illustration, a map data provision 262 may be operative to perform quality checks terminal 263 on the output 261 of the stream processing and to generate map dated hundred 69 for distribution to map data consumers.

The stream processing and, if present, the map data provision may be implemented several times to allow several different map products to be generated. The several different map products may be distinguished from each other in, e.g., the information included therein. The several different map products may alternatively or additionally be distinguished from each other in, e.g., the weight given to various KPIs, such as freshness v. accuracy or coverage. Freshness v. accuracy or coverage may be traded against each other to a certain degree by controlling operation parameters of the stream processing. For illustration, an increase in the time interval 99 in which monitoring is performed after detection of an integrity issues may increase coverage (by reducing the risk that information on a modification that causes an integrity issue must be discarded when generating the output 261 of the stream processing), at the expense of freshness. Vice versa, a decrease in the time interval 99 in which monitoring is performed after detection of an integrity issues may reduce coverage (by increasing the risk that information on a modification that causes an integrity issue must be discarded when generating the output 261 of the stream processing), while increasing freshness.

Figure 32:
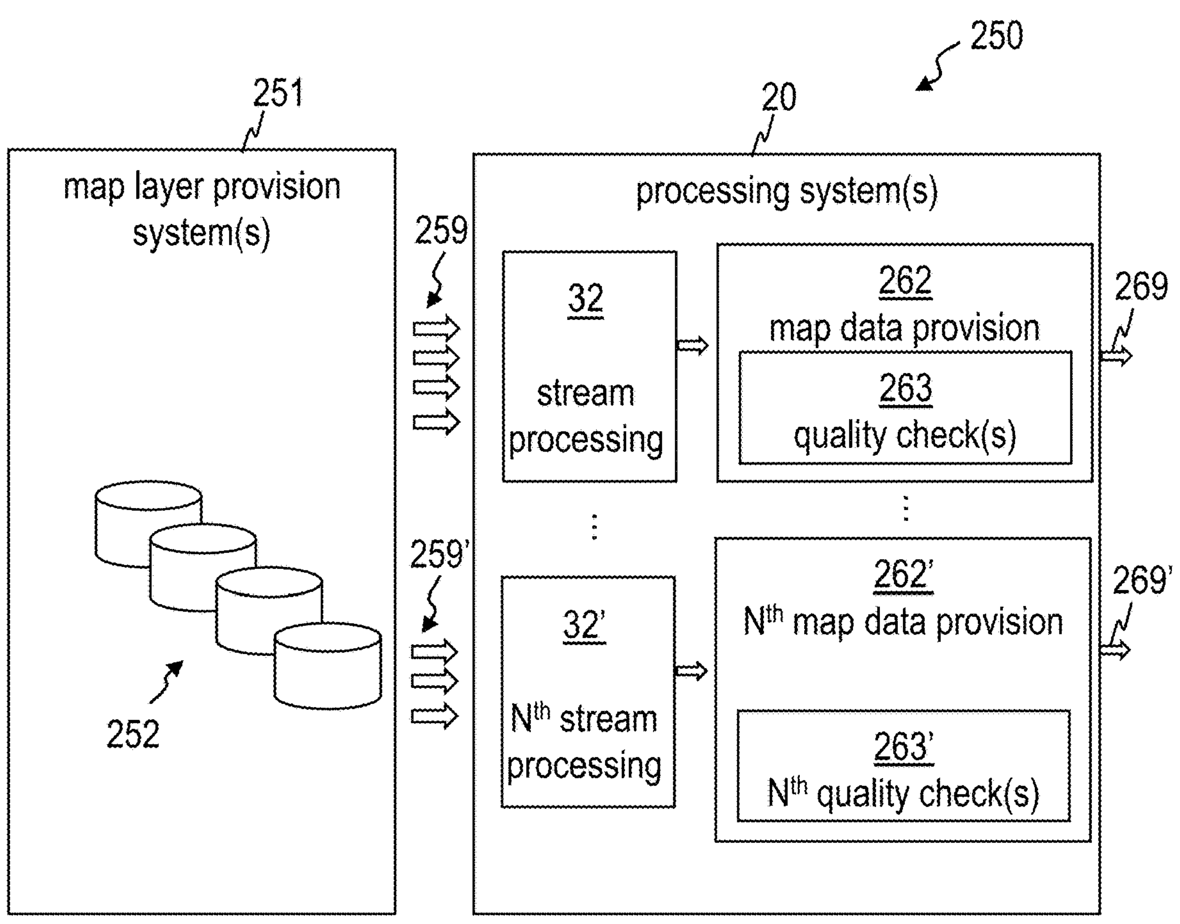
FIG. 32 is a schematic representation of a system comprising the processing system.

FIG. 32 shows the system 250 in which the processing system 20 performs a stream processing 32 to generate map data 269 of a first map product, and performs one or several additional instances of stream processing 32' (respectively including the integrity verification) to generate map data 269' of one or several additional map products. The output 269 may be distinguished, with regard to timing of the output messages in the output stream of the output 269, from the output 269'.

Optionally, and as also schematically illustrated in FIG. 32, different instances of the stream processing may receive different several streams 259, 259' as input. For illustration, for generating map data 269', the map layers considered need not be completely identical to those used for generating map data 269.

Figure 33:
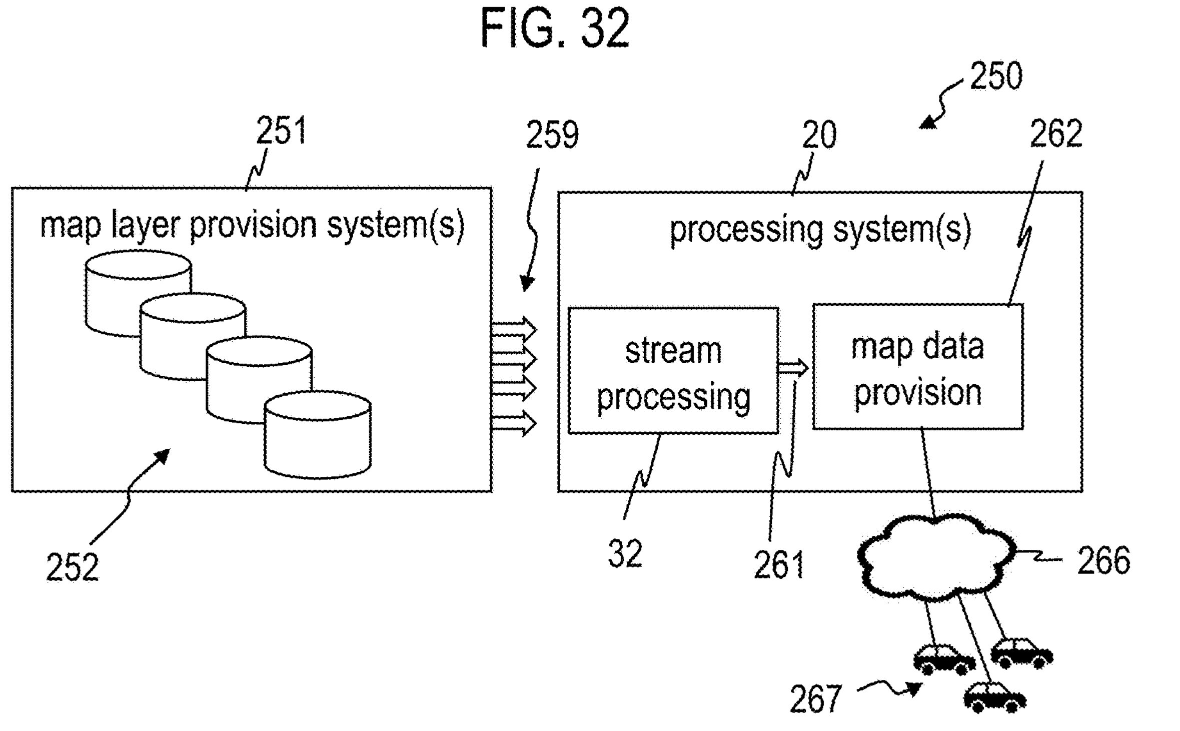
FIG. 33 is a schematic representation of a system comprising the processing system.

FIG. 33 shows a schematic representation of the system 250 which comprises the one or several map layer provision systems 251, the processing system 20, and one or several map data consumers 267. The one or several map data consumers 267 may be operative to receive map data based on the output stream 261 of the stream processing 32 to perform at least one map-based function based thereon. The one or several map data consumers 267 may be operative to receive the map data as a stream of map data via communication links, which may be realized using a communication network 266. The communication network 266 may comprise a wide area network and/or a cellular network.

Figure 34:
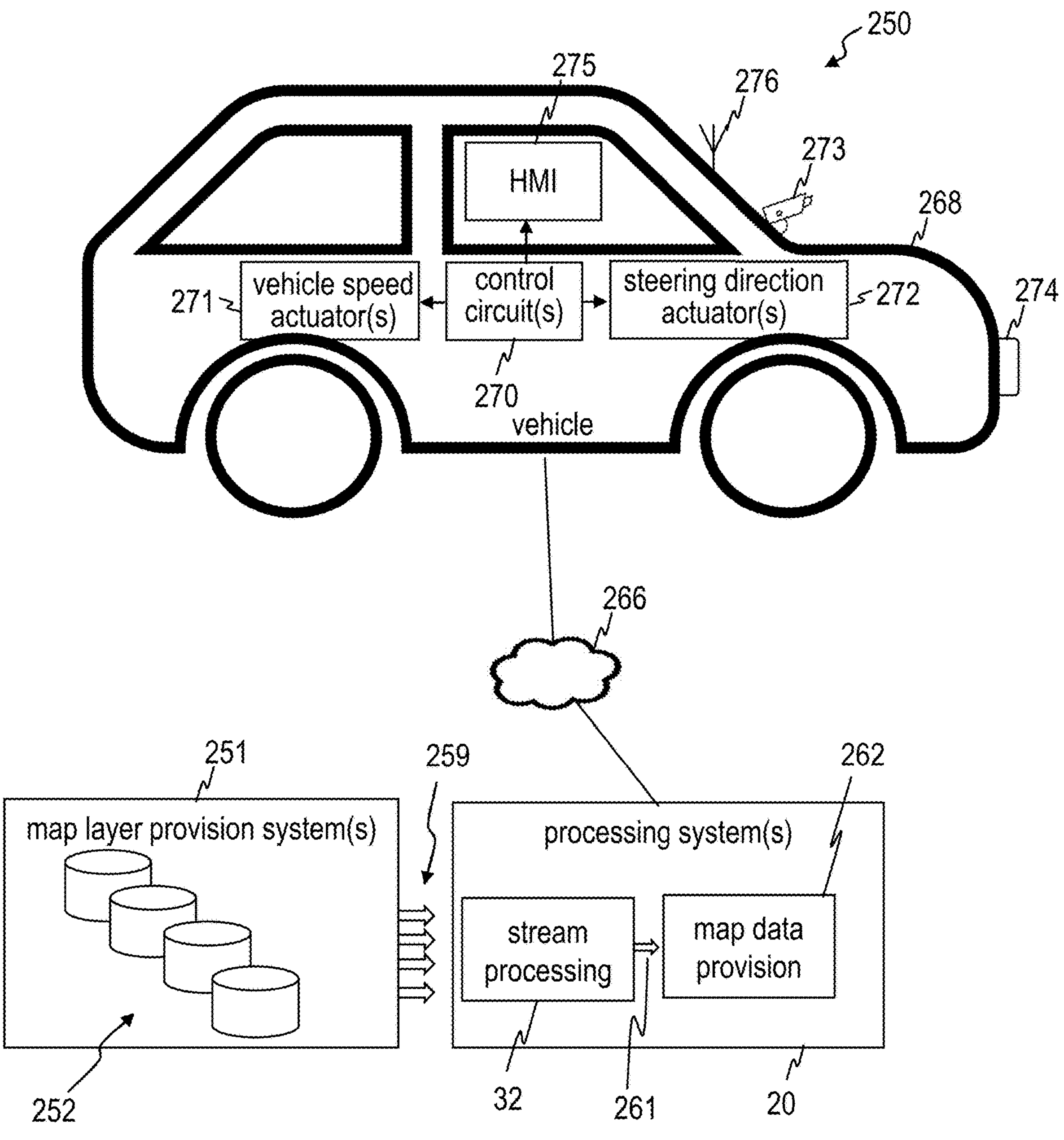
FIG. 34 is a schematic representation of a system comprising the processing system.

FIG. 34 shows a schematic representation of the system 250 which comprises the one or several map layer provision systems 251, the processing system 20, and a map data consumer 268. The map data consumer 268 comprises at least one control circuit 270. The at least one control circuit 270 may be communicatively coupled with a communication interface 276 of the map data consumer 268. The at least one control circuit 270 may be operative to perform a map-based function based on the map data that is based on the output stream 261 of the stream processing. The at least one control circuit 270 may be operative to perform at least one control action, based at least on the map data, to control one or several actuators 271, 272 and/or a human machine interface 275. The at least one control circuit 270 may be operative to use the map data in combination with sensor data captured using one or several sensors, such as a distance sensor 274 and/or a camera 273, to perform the at least one control operation.

Figure 35:
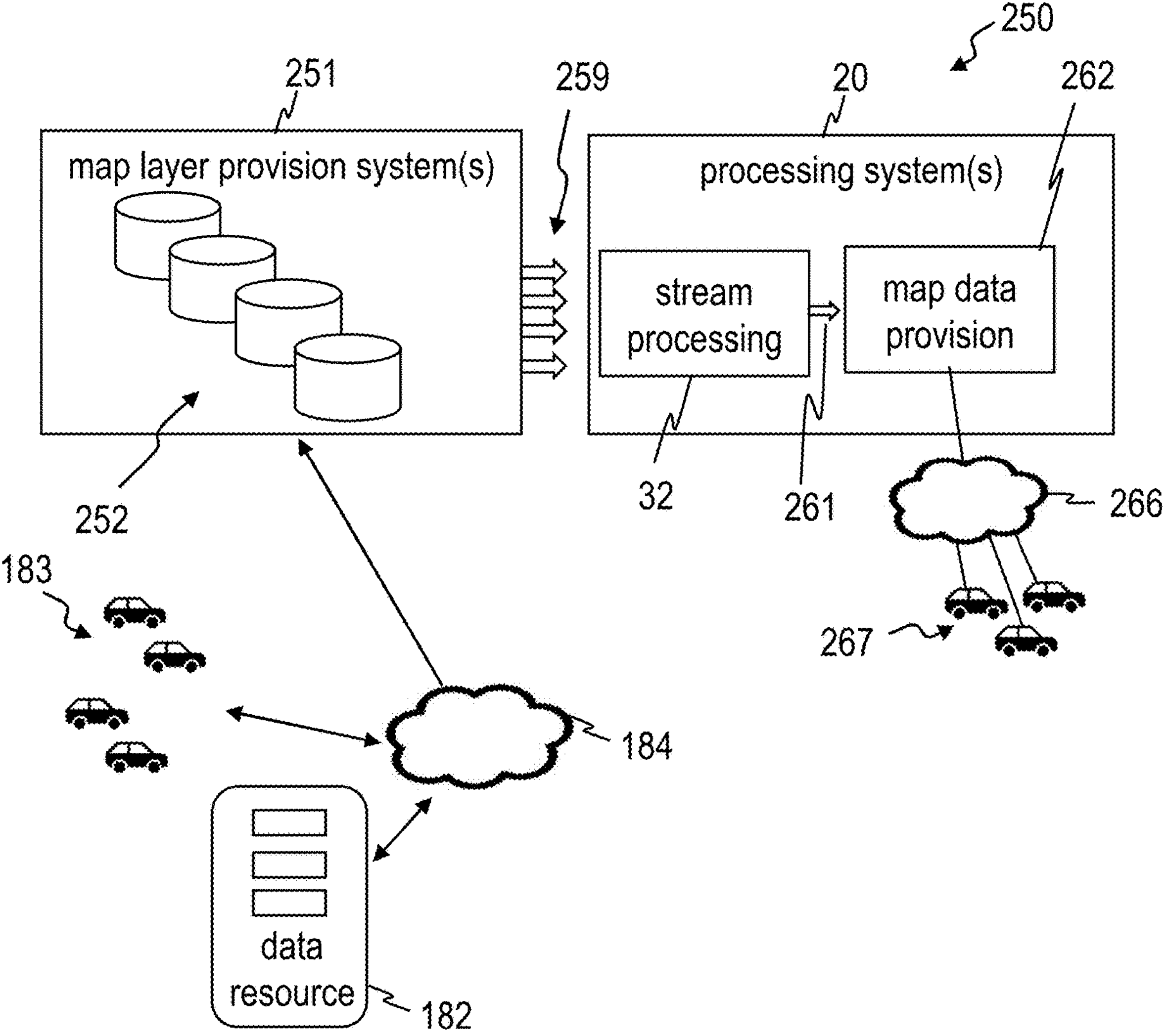
FIG. 35 is a schematic representation of a system comprising the processing system.

FIG. 35 shows a schematic representation of the system 250 which comprises the one or several map layer provision systems 251, the processing system 20, and a systems 182, 183 from which the one or several map layer provision systems 251 obtain data based upon which modifications of map object definitions are performed. The systems 182, 183 may comprise a vehicle fleet 183 that provides sensor data to the map layer provision system(s) 251 and/or other data resources 182 communicatively coupled to the map layer provision system(s) 251. The system 250 also comprises one or several map data consumers 267. The map data consumers 267 may comprise at least one map data consumer operative as described in association with FIG. 34.

Figure 36:
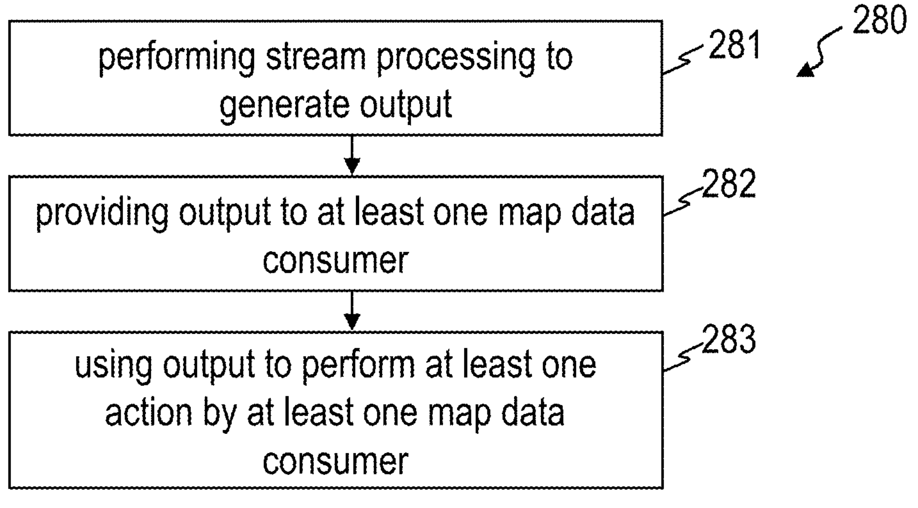
FIG. 36 is a flow chart of a method.

FIG. 36 is a flow chart of a method 280. The method 280 may be performed automatically using the processing system 20 and at least one map data consumer, such as map data consumer 268.

At process block 281, the processing system 20 performs stream processing of several streams. Each of the several streams comprises messages indicative of modifications to a map layer with which the respective stream is associated. The several streams may be asynchronous.

At process block 282, output is provided by the processing system 20 to at least one map data consumer. The output is based on the stream processing. The output may comprise a stream of map data.

At process block 283, the map data consumer performs at least one action based at least on the output of the stream processing. The at least one action may comprise a control action. The at least one action may be any one or any combination of a route search, a navigation function, a driver assistance function, an advanced driver assistance function, an autonomous driving function. The at least one action may comprise at least one control action. The at least one control action may comprise controlling at least one actuator and/or controlling a human machine interface.

Figure 37:
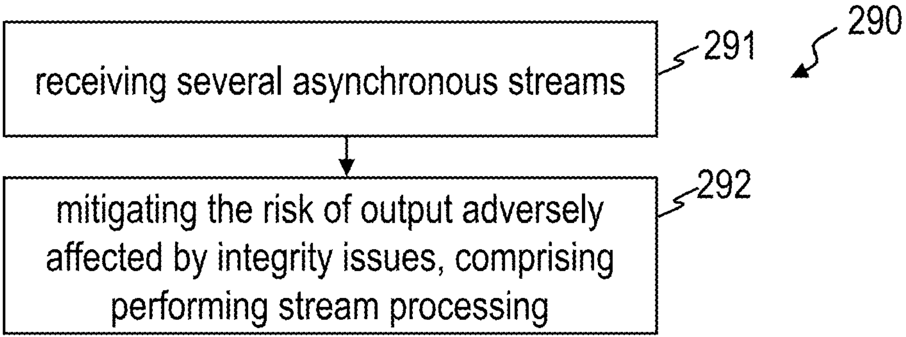
FIG. 37 is a flow chart of a method.

FIG. 37 is a flow chart of a method 290. The method 290 may be performed automatically using the processing system 20.

At process block 291, the processing system 20 receives several asynchronous streams.

At process block 292, the processing system 20 mitigates the risk of an output of a stream processing of the several asynchronous streams being adversely affected by an integrity issue. This comprises performing the stream processing including an integrity verification, as discussed in detail herein.

While embodiments have been described with reference to the drawings, modifications and alterations may be implemented in other embodiments. While exemplary use cases in which the methods and vehicle processing system can be applied have been described in detail, the techniques disclosed herein may be used in association with a variety of additional scenarios. For further illustration, while exemplary map layers have been described, the techniques disclosed herein are generally applicable to a wide variety of map layers.

This description and the accompanying drawings that illustrate aspects and embodiments of the present invention should not be taken as limiting-the claims defining the protected invention. In other words, while the invention has been illustrated and described in detail in the drawings and foregoing description, such illustration and description are to be considered illustrative and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figures individually although they may not have been described in the afore or following description. Also, single alternatives of the embodiments described in the Figures and the description and single alternatives of features thereof can be disclaimed from the subject matter of the invention or from disclosed subject matter. The disclosure comprises subject matter consisting of the features defined in the claims or the embodiments as well as subject matter comprising said features.

The term "comprising" does not exclude other elements or process blocks, and the indefinite article "a" or "an" does not exclude a plurality. A single unit or process block may fulfil the functions of several features recited in the claims. The mere fact that certain measures are recited in mutually different dependent claims does not indicate that a combination of these measures cannot be used to advantage. Components described as coupled or connected may be electrically or mechanically directly coupled, or they may be indirectly coupled via one or more intermediate components. Any reference signs in the claims should not be construed as limiting the scope.

A machine-readable instruction code may be stored/distributed on a suitable medium, such as an optical storage medium or a solid-state medium supplied together with or as part of other hardware, but may also be distributed in other forms, such as via a wide area network or other wired or wireless telecommunication systems. Furthermore, a machine-readable instruction code can also be a data structure product or a signal for embodying a specific method such as the method according to embodiments.

The invention claimed is:

1. A method of modifying map layer data, the method comprising:

modifying, by a first map layer provision system, a first map object definition of a first parent layer of map layer data, the first map object definition referencing a map object of the first parent layer;

transmitting, by the first map layer provision system, the modified first map object definition to a processing system in a first message of a first stream of messages from the first map layer provision system and to a second map layer provision system;

modifying, by the second map layer provision system, a second map object definition of a first child layer of the first parent layer, the second map object definition referencing the map object of the first parent layer;

transmitting, by the second map layer provision system, the modified second map object definition to the processing system in a first message of a second stream of messages from the second map layer provision system to the processing system;

determining, by the processing system, whether the first message of the first stream of messages and the first message of the second stream of messages are associated with an integrity issue;

transmitting, by the processing system, an output stream based on the first message of the first stream of messages and the first message of the second stream of messages if it is determined that the first message of the first stream of messages and the first message of the second stream of messages are not associated with an integrity issue; and if it is determined that the first message of the first stream of messages and the first message of the second stream of messages are associated with an integrity issue, transmitting, by the processing system and to at least one of the first map layer provision system and the second map layer provision system, feedback indicating an integrity issue associated with the first message of the first stream of messages and the first message of the second stream of messages.

2. The method of claim 1, wherein each of the messages of the first stream and the second stream include a modification to a map object definition.

3. The method of claim 2, wherein each of the messages of the first stream and the second stream comprises a unique identifier of a map object modified by the modification of the message.

4. The method of claim 2, wherein the first map layer provision system transmits the first stream with a timing that is independent of transmission of the second stream by the second map layer provision system.

5. The method of claim 1, wherein the integrity issue comprises at least one inconsistency between the modified first map object definition and the modified second map object definition.

6. The method of claim 1, wherein the integrity issue comprises a referential inconsistency caused by at least one of the modified first map object definition and the modified second map object definition.

7. The method of claim 6, wherein the first stream and the second stream are asynchronous.

8. The method of claim 5, wherein the integrity issue comprises a referential inconsistency caused by at least one of the modified first map object definition and the modified second map object definition.

9. The method of claim 5, wherein the issue comprises an integrity issue with the map layer data as modified by the modified first map object definition and the modified second map object definition.

10. The method of claim 1, further comprising, in response to the feedback:

modifying, by the second map layer provision system, the modified second map object definition based on the indicated integrity issue; and communicating, by the second map layer provision system, the modification of the modified second map object definition to the processing system.

11. The method of claim 10, wherein communicating, by the second map layer provision system, the modification of the modified second map object definition to the processing system comprises:

transmitting, by the second map layer provision system, the modification of the modified second map object definition to the processing system in a second message of the second stream of messages.

12. The method of claim 1, wherein the map layer is comprised by an acyclic graph of map layers, wherein the acyclic graph comprises a base map layer defining nodes and links of a navigable network, wherein a parent layer comprises one or both of:

the base map layer; and a further map layer that references the nodes and the links defined by the base map layer, the further map layer being different from the base map layer.

13. The method of claim 1, further comprising performing an action based at least on the output stream, wherein the action comprises one or more of:

route search;

route guidance;

an automated driving function; and traffic flow control.

14. A non-transitory computer readable storage medium storing instructions which, when executed by at least one processing circuit, cause the at least one processing circuit to perform a method of modifying map layer data, the method comprising:

modifying, by a first map layer provision system, a first map object definition of a first parent layer of map layer data, the first map object definition referencing a map object of the first parent layer;

transmitting, by the first map layer provision system, the modified first map object definition to a processing system in a first message of a first stream of messages from the first map layer provision system and to a second map layer provision system;

modifying, by a second map layer provision system, a second map object definition of a first child layer of the first parent layer, the second map object definition referencing the map object of the first parent layer;

determining, by the processing system, whether the first message of the first stream of messages and the first message of the second stream of messages are associated with an integrity issue;

transmitting, by the processing system, an output stream based on the first message of the first stream of messages and the first message of the second stream of messages if it is determined that the first message of the first stream of messages and the first message of the second stream of messages are not associated with an integrity issue; and if it is determined that the first message of the first stream of messages and the first message of the second stream of messages are associated with an integrity issue, transmitting, by the processing system and to at least one of the first map layer provision system and the second map layer provision system, feedback indicating an integrity issue associated with the first message of the first stream of messages and the first message of the second stream of messages.

15. The non-transitory computer readable storage medium of claim 14, wherein each of the messages of the first stream and the second stream include a modification to a map object definition.

16. The non-transitory computer readable storage medium of claim 15, wherein each of the messages of the first stream and the second stream comprises a unique identifier of a map object modified by the modification of the message.

17. A system for modifying map layer data, the system comprising:

a first map layer provision system comprising:

a first memory; and a first at least one processing circuit, the first at least one processing circuit configured to:

modify a first map object definition of a first parent layer of map layer data, the first map object definition referencing a map object of the first parent layer; and transmit the modified first map object definition to a processing system in a first message of a first stream of messages from the first map layer provision system and to a second map layer provision system;

the second map layer provision system comprising:

a second memory; and a second at least one processing circuit, the second at least one processing circuit configured to:

modify a second map object definition of a first child layer of the first parent layer, the second map object definition referencing the map object of the first parent layer; and transmit the modified second map object definition to the processing system in a first message of a second stream of messages from the second map layer provision system to the processing system; and the processing system comprising:

a third memory; and a third at least one processing circuit, the third at least one processing circuit configured to:

determine whether the first message of the first stream of messages and the first message of the second stream of messages are associated with an integrity issue;

transmit an output stream based on the first message of the first stream of messages and the first message of the second stream of messages if it is determined that the first message of the first stream of messages and the first message of the second stream of messages are not associated with an integrity issue; and if it is determined that the first message of the first stream of messages and the first message of the second stream of messages are associated with an integrity issue, transmit feedback indicating an integrity issue associated with the first message of the first stream of messages and the first message of the second stream of messages to at least one of the first map layer provision system and the second map layer provision system.

18. The system of claim 17, wherein:

each of the messages of the first stream and the second stream include a modification to a map object definition.

19. The system of claim 18, wherein each of the messages of the first stream and the second stream comprises a unique identifier of a map object modified by the modification of the message.

* * * * *